United States Patent
Konno et al.

(10) Patent No.: US 11,766,882 B2
(45) Date of Patent: Sep. 26, 2023

(54) PRINTING APPARATUS AND IMAGE PROCESSING APPARATUS

(71) Applicant: CANON KABUSHIKI KAISHA, Tokyo (JP)

(72) Inventors: Yuji Konno, Kanagawa (JP); Satoshi Wada, Tokyo (JP); Naoko Baba, Kanagawa (JP); Hajime Nagai, Kanagawa (JP); Shingo Nishioka, Kanagawa (JP); Kei Yoshizawa, Kanagawa (JP); Junichi Saito, Kanagawa (JP); Serena Yoshikawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 17/479,015

(22) Filed: Sep. 20, 2021

(65) Prior Publication Data

US 2022/0072878 A1   Mar. 10, 2022

(30) Foreign Application Priority Data

Sep. 24, 2020   (JP) ................... 2020-159661

(51) Int. Cl.
| | |
|---|---|
| *B41J 11/68* | (2006.01) |
| *B41J 11/00* | (2006.01) |
| *B41J 2/01* | (2006.01) |
| *B41J 11/42* | (2006.01) |
| *B41J 11/66* | (2006.01) |

(52) U.S. Cl.
CPC ............. *B41J 11/68* (2013.01); *B41J 2/01* (2013.01); *B41J 11/42* (2013.01); *B41J 11/663* (2013.01)

(58) Field of Classification Search
CPC ..... B41J 11/68; B41J 2/01; B41J 11/42; B41J 11/663; B41J 11/0065; G06K 15/022
See application file for complete search history.

(56) References Cited

U.S. PATENT DOCUMENTS

2020/0164664 A1*  5/2020  Yamamuro .......... B41J 2/17566

FOREIGN PATENT DOCUMENTS

| EP | 3012106 A1 * | 4/2016 | .......... B41J 2/04581 |
|---|---|---|---|
| JP | 2017-013438 A | 1/2017 | |
| JP | 2017013438 A * | 1/2017 | |

OTHER PUBLICATIONS

Michii, MachineTranslationofJP-2017013438-A, 2017 (Year: 2017).*

* cited by examiner

*Primary Examiner* — Scott A Richmond
(74) *Attorney, Agent, or Firm* — VENABLE LLP

(57) ABSTRACT

A printing apparatus includes an image processing unit and generates a product by performing printing on a print medium conveyed in a conveyance direction intersecting a width direction, based on data for printing, and then cutting a width-direction end portion of a printed image, wherein the image processing unit calculates a first ink application amount of a first area formed at one end portion in the width direction on a leading edge side of the image which is located on a downstream side in the conveyance direction during printing and a second ink application amount of a second area formed at the other end in the width direction on the leading edge and enlarges the image data at a predetermined ratio to obtain the data for printing in a case where at least one of the first ink application amount and the second ink application amount exceeds a threshold value.

14 Claims, 17 Drawing Sheets

PRINTING APPARATUS AND IMAGE PROCESSING APPARATUS

BACKGROUND OF THE INVENTION

Field of the Invention

The present invention relates to a printing apparatus that is capable of cutting a conveyed sheet-shaped printing medium and to an image processing apparatus thereof.

Description of the Related Art

Japanese Patent Laid-Open No. 2017-013438 discloses a technology related to a printing apparatus which is equipped with a slitter for cutting a printed print medium along the conveyance direction of the print medium. Specifically, according to the printing apparatus disclosed in Japanese Patent Laid-Open No. 2017-013438, the leading edge of a conveyed print medium is inserted to a blade part of the slitter, so that the print medium is cut along the conveyance direction in accordance with conveyance of the print medium.

In such a printing apparatus described in Japanese Patent Laid-Open No. 2017-013438, it is possible to selectively execute marginless printing, in which no margin is provided around an image, and width-margin printing, in which a margin is provided around the image. In the case of marginless printing, the image is printed so as to protrude outward by about several mm in the width direction from the cutting position to be cut by the slitter. It is preferable that this protruding amount is as small as possible in order to suppress the ink consumption amount.

SUMMARY OF THE INVENTION

The present invention has been made in view of the above-described problems, so as to provide a technology capable of generating a product desired by a user even in a case where there is a possibility that the cutting position changes in the width direction of the print medium.

In the first aspect of the present invention, there is provided a printing apparatus including:

a conveyance unit configured to convey a print medium in a conveyance direction;

a printing unit configured to print an image by applying ink to the print medium which is conveyed by the conveyance unit;

a slitter unit disposed on a downstream side in the conveyance direction relative to the printing unit and configured to cut the print medium along the conveyance direction at a position according to a size of a product in a width direction of the print medium, the width direction intersecting the conveyance direction;

an image processing unit configured to perform image processing on image data to obtain data for printing; and a control unit configured to control the slitter unit to cut a width-direction end portion of the printed image after the image is printed based on the data for printing, so as to thereby generate the product, wherein the image processing unit calculates a first ink application amount of a first area and a second ink application amount of a second area, based on the image data, the first area being formed at one end portion in the width direction on a leading edge side of the image which is located on the downstream side in the conveyance direction during printing, the second area being formed at the other end in the width direction on the leading edge, and enlarges the image data at a predetermined ratio to obtain the data for printing in a case where at least one of the first ink application amount and the second ink application amount exceeds a threshold value.

In the second aspect of the present invention, there is provided a printing apparatus including:

a conveyance unit configured to convey a print medium in a conveyance direction;

a printing unit configured to print an image by applying ink to the print medium which is conveyed by the conveyance unit;

a slitter unit disposed on a downstream side in the conveyance direction relative to the printing unit and configured to cut the print medium along the conveyance direction at a position according to a size of a product in a width direction of the print medium, the width direction intersecting the conveyance direction;

an image processing unit configured to perform image processing on image data to obtain data for printing; and a control unit configured to control the slitter unit to cut a width-direction end portion of the printed image after the image is printed based on the data for printing, so as to thereby generate the product, wherein the image processing unit calculates a first ink application amount of a first area, a second ink application amount of a second area, a third ink application amount of a third area, and a fourth ink application amount of a fourth area, based on the image data, the first area being formed at one end portion in the width direction on a leading edge side of the image which is located on the downstream side in the conveyance direction during printing, the second area being formed at the other end portion in the width direction on the leading edge side, the third area being formed at one end portion in the width direction on a rear edge side of the image which is located on an upstream side in the conveyance direction during printing, the fourth area being formed at the other end portion in the width direction on the rear edge side, rotates the image data by 180° to obtain the data for printing in a case where at least one of the first ink application amount and the second ink application amount exceeds a threshold value and both of the third ink application amount and the fourth ink application amount are equal to or less than the threshold value, and enlarges the image data at a predetermined ratio without rotating the image data to obtain the data for printing in a case where at least one of the first ink application amount and the second ink application amount exceeds the threshold value and at least one of the third ink application amount and the fourth ink application amount exceeds the threshold value.

In the third aspect of the present invention, there is provided an image processing apparatus that generates data for printing to be used by a printing apparatus for printing of an image, the printing apparatus being configured to generate a product by printing the image by applying ink to a print medium which is conveyed in a conveyance direction and cutting a width-direction end portion of the print medium along the conveyance direction, the width direction intersecting the conveyance direction, the image processing apparatus including:

a calculation unit configured to calculate a first ink application amount of a first area and a second ink application amount of a second area, based on image data, the first area being formed at one end portion in the width direction on a leading edge side of the image which is located on a downstream side in the conveyance direction during printing, the second area being formed at the other end in the width direction on the leading edge side;

an enlargement unit configured to enlarge the image data at a predetermined ratio in a case where at least one of the first ink application amount and the second ink application amount exceeds a threshold value; and a creation unit configured to create the data for printing by performing image processing on the image data enlarged by the enlargement unit.

In the fourth aspect of the present invention, there is provided an image processing apparatus that generates data for printing to be used by a printing apparatus for printing of an image, the printing apparatus being configured to generate a product by printing the image by applying ink to a print medium which is conveyed in a conveyance direction and cutting a width-direction end portion of the print medium along the conveyance direction, the width direction intersecting the conveyance direction, the image processing apparatus including:

a calculation unit configured to calculate a first ink application amount of a first area, a second ink application amount of a second area, a third ink application amount of a third area, and a fourth ink application amount of a fourth area, based on image data, the first area being formed at one end portion in the width direction on a leading edge side of the image which is located on a downstream side in the conveyance direction during printing, the second area being formed at the other end in the width direction on the leading edge side, the third area being formed at one end portion in the width direction on a rear edge side of the image which is located on an upstream side in the conveyance direction during printing, the fourth area being formed at the other end in the width direction on the rear edge side;

an enlargement unit configured to rotate the image data by 180° in a case where at least one of the first ink application amount and the second ink application amount exceeds a threshold value and both of the third ink application amount and the fourth ink application amount are equal to or less than the threshold value and configured to enlarge the image data at a predetermined ratio without rotating the image data in a case where at least one of the first ink application amount and the second ink application amount exceeds the threshold value and at least one of the third ink application amount and the fourth ink application amount exceeds the threshold value; and a creation unit configured to create the data for printing by performing image processing on the image data processed by the enlargement unit.

According to the present invention, it becomes possible to generate a product desired by a user even in a case where there is a possibility that a cutting position changes in the width direction of a print medium.

Further features of the present invention will become apparent from the following description of exemplary embodiments with reference to the attached drawings.

DESCRIPTION OF THE EMBODIMENTS

Hereinafter, with reference to the accompanying drawings, detailed explanations will be given of examples of a printing apparatus and an image processing apparatus according to the present embodiments. Note that it is not intended that the following embodiments limit the present invention, and every combination of the characteristics explained in the embodiments is not necessarily essential to the solutions in the present invention. In addition, unless otherwise specified, the relative positions, shapes, etc., of the constituent elements described in the present embodiments are merely examples and are not intended to limit the range of this invention thereto.

Note that, in the following explanations, "printing" includes, not only a case of forming meaningful information such as a letter or a figure, but also a case of forming an image, a design, a pattern, etc., on a print medium in a broad sense regardless of being meaningful or meaningless or a case of processing a medium. Further, as for "printing", whether to be actualized in such a manner that a human can visually perceive or not does not matter. Furthermore, although it is assumed that the "print medium" is a print medium in the embodiments, a cut sheet, a cloth, a plastic film, etc., are also possible.

First Embodiment

Figure 1:
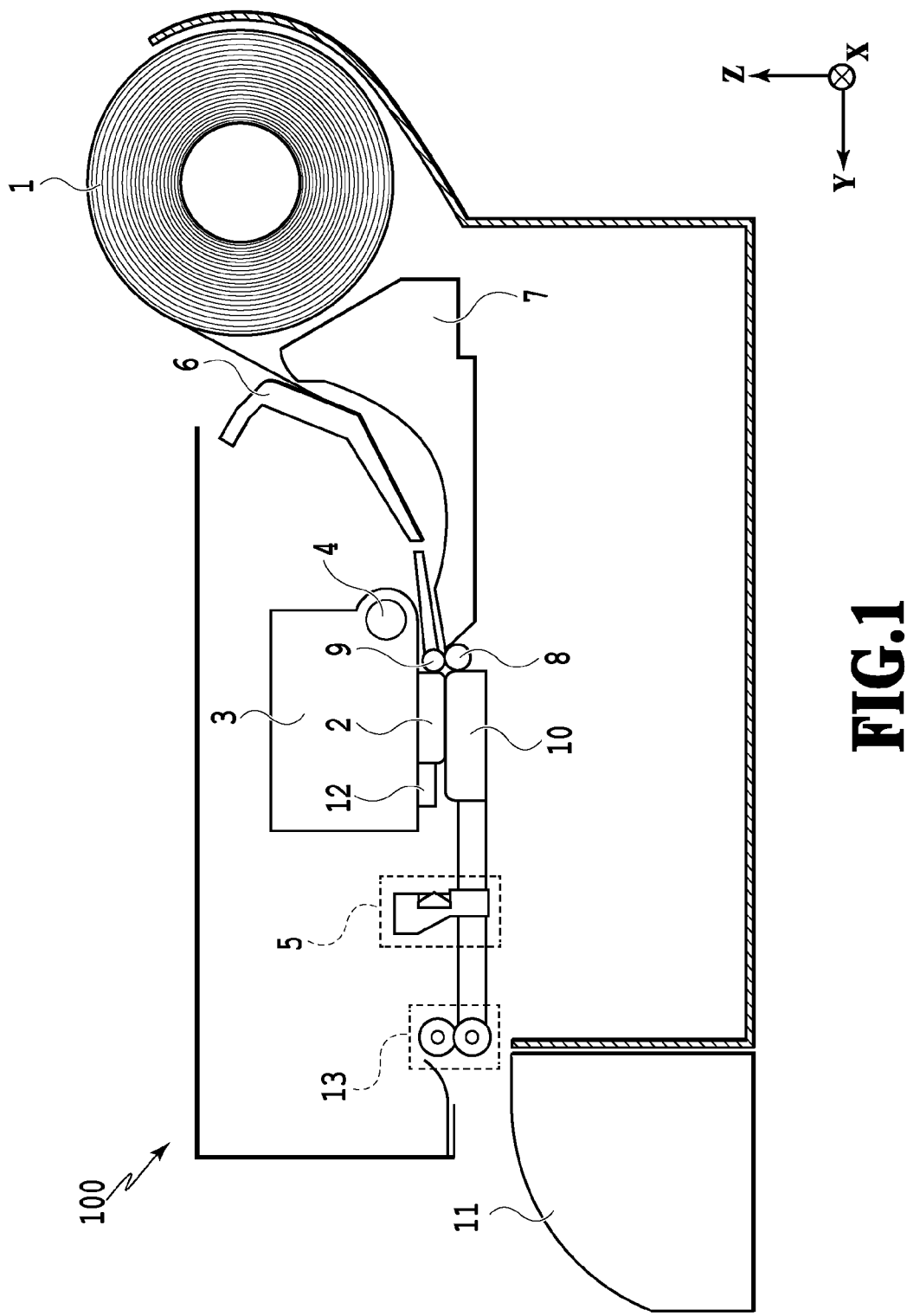
FIG. 1 is an schematic configuration diagram of a printing apparatus.

First, with reference to FIG. 1 through FIG. 11, an explanation will be given of a printing apparatus according to the first embodiment. FIG. 1 is a schematic configuration diagram of a printing apparatus according to an embodiment.

<Overall Configuration of the Printing Apparatus>

The printing apparatus 100 of FIG. 1 is an inkjet printing apparatus that applies ink to a long sheet-shaped print medium for printing, based on job data which is output from a host apparatus (not illustrated in the drawings). In the present embodiment, the printing apparatus 100 holds a roll which is formed by winding the long sheet-shaped print medium 1. The print medium 1 unwound from the roll is conveyed downstream through a conveyance path formed by the upper guide 6 and the lower guide 7. Thereafter, the print medium 1 is nipped by the conveyance roller 8 and the pinch roller 9 and conveyed to an image printing part. The image printing part is equipped with the print head 2, the carriage 3 on which the print head 2 is mounted, and the platen 10 arranged at a position facing the print head 2. The print medium 1 is conveyed onto the platen 10 by the conveyance roller 8. In the image printing part, ink ejected from the print head 2 is applied to the print medium 1 which is conveyed onto the platen 10, so that an image is printed.

The carriage 3 is supported so as to be capable of performing a sliding motion by the guide shaft 4, which extends in the X direction that intersects (orthogonally in the present embodiment) the Y direction which is the conveyance direction of the print medium 1, and by a guide rail (not illustrated in the drawing), which is disposed so as to be parallel to the guide shaft 4. Further, the carriage 3 is equipped with the reflection type detection sensor 12 facing the platen 10 on the downstream side relative to the print head 2 in the conveyance direction of the print medium 1.

Accordingly, the carriage 3 is configured to be capable of performing scanning, i.e., reciprocating, in the X direction along the guide shaft 4 while holding the print head 2. The print head 2 is held by the carriage 3 so that the nozzle plane on which the nozzles (not illustrated in the drawings) for ejecting ink are formed faces the platen 10. Further, when the carriage 3 is performing scanning in the X direction, ink is ejected from the nozzles of the print head 2, so that the ink is applied to the print medium 1 for printing. In this way, in the present embodiment, the print head 2 functions as a printing unit that performs printing on a print medium. Note that, in the present embodiment, the print head 2 ejects four colors of ink, i.e., cyan (C), magenta (M), yellow (Y), and black (K).

The printing apparatus 100 makes the print head 2 perform scanning in the X direction via the carriage 3 in order to perform printing on the print medium 1, then conveys the print medium 1 by a predetermined amount with the conveyance roller 8, and then makes the print head 2 perform scanning again via the carriage 3 in order to perform printing on the print medium 1. In this way, in the printing apparatus 100, the printing operation, in which the print head 2 is made to perform scanning in the X direction for printing, and the conveyance operation, in which the print medium 1 is conveyed by a predetermined amount in the conveyance direction, are repeatedly executed, so that an image based on image data will thereby be printed on the print medium 1.

The detection sensor 12 has a configuration capable of detecting the intensity of reflected light at a detection position (detection spot) by irradiating the platen 10 and the print medium 1 which is conveyed on the platen 10 with light and receiving the reflected light. The reflection intensity, which is the intensity of such reflected light, becomes stronger on a white print medium and becomes weaker on a high-density pattern or a black member. Therefore, in a case where the platen 10 is black and the print medium 1 is white, the reflection intensities of the two are significantly different. Accordingly, based on the detection result of the detection sensor 12, the leading edge portion of the conveyed print medium 1 in the conveyance direction can be detected. Further, since the detection sensor 12 is mounted on the carriage 3, the position of an end portion of the print medium 1 in the width direction (the X direction) can be detected by the reciprocal movement of the carriage 3 in the X direction.

The cutter 5 for cutting the print medium 1 in the X direction is disposed on the downstream side relative to the carriage 3 in the conveyance direction of the print medium 1. Further, the slitter 13 for cutting the print medium 1 along the conveyance direction is disposed on the downstream side relative to the cutter 5 in the conveyance direction. The discharge guide 11 for discharging the cut print medium 1 is disposed on the downstream side relative to this slitter 13 in the conveyance direction. Note that, although an illustration is omitted in FIG. 1, the multiple spurs 72 are held by the holder 74 and arranged along the X direction on the upstream side relative to the slitter 13 as well as on the downstream side relative to the carriage 3 in the conveyance direction (see FIG. 7A and FIG. 7B).

<Configuration of the Cutter>

Figure 2:
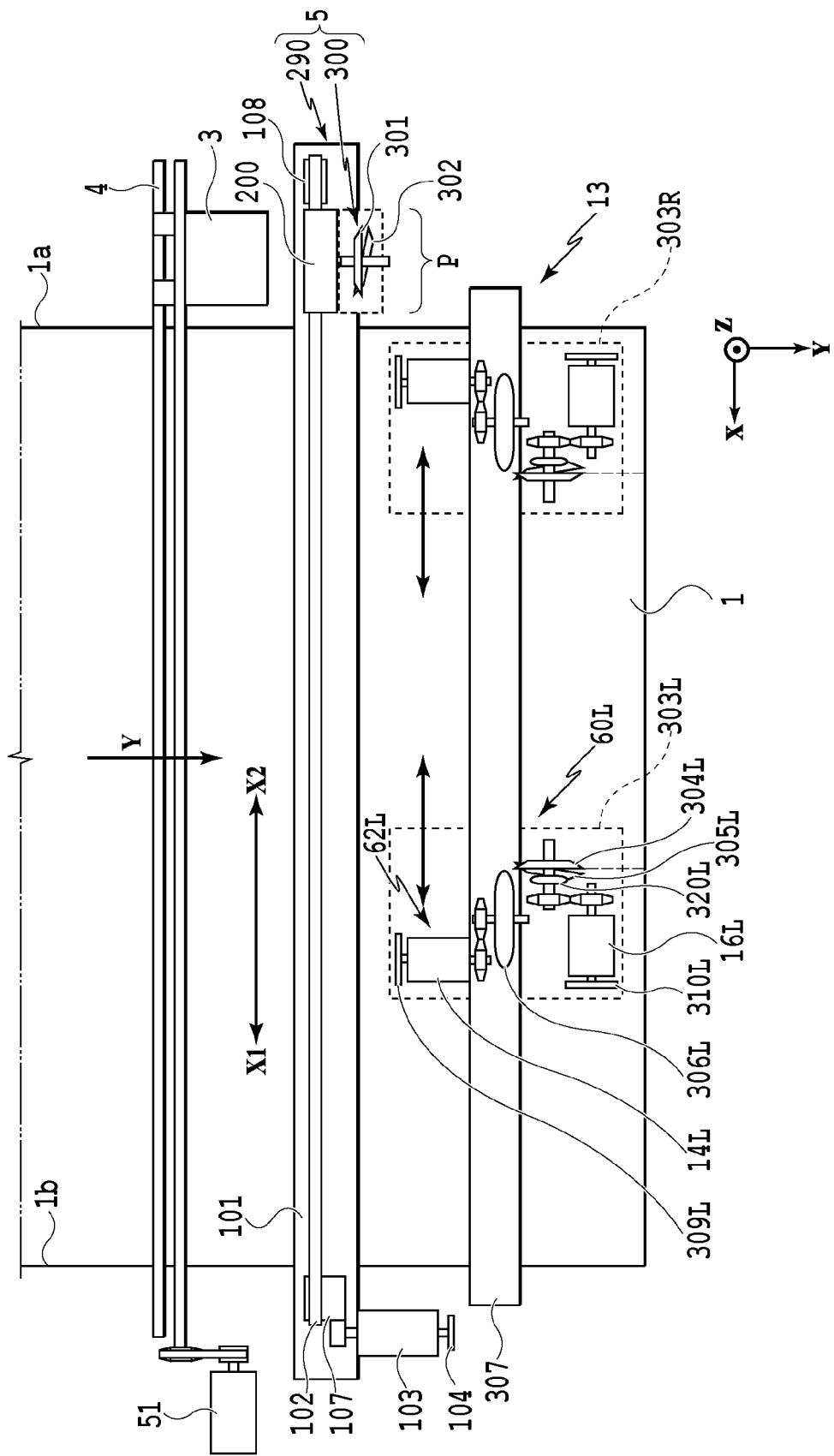
FIG. 2 is a schematic configuration diagram in the vicinity of a cutter and a slitter.

FIG. 2 is a schematic configuration diagram of the vicinity of the cutter 5 and the slitter 13 of the printing apparatus 100. In the present specification, "L" and "R" at the end of reference signs indicate a member on the left side (i.e., the +X side) of the drawing and a member on the right side (i.e., the −X side) of the drawing, respectively. In the present specification, such an end of a reference sign may be omitted for members that are the same on the left side and the right side.

The cutter 5 is equipped with the cutter unit 300, which is a cutting part that cuts the print medium 1 in the X direction, and the moving unit 290, which is a moving part that moves the cutter unit 300 along the X direction.

The moving unit 290 is equipped with the cutter carriage 200, which is disposed on the guide rail 101 extending in the X direction so as to be capable of performing a sliding motion. The cutter carriage 200 is equipped with the cutter unit 300 and the belt 102. The belt 102 is in an endless shape wrapped around the motor pulley 107 and the tensioner pulley 108 disposed in the vicinity of the left and right end portions of the guide rail 101. Further, the belt 102 is configured to be movable by driving of the cutter motor 103 which is connected to the motor pulley 107.

The cutter motor 103 is equipped with the cutter encoder 104. The cutter encoder 104 counts the number of pulses corresponding to driving of the cutter motor 103. Based on the origin position of the cutter carriage 200 and the number of pulses obtained by the cutter encoder 104, the later-described control part 410 controls the movement position of the cutter unit 300 in the X1 and X2 directions.

The cutter unit 300 includes the upper movable blade 301 and the lower movable blade 302, so that the print medium 1 is cut at the contact point therebetween while the cutter unit 300 moves in the X1 direction. Further, the upper movable blade 301 and the lower movable blade 302 are connected to the cutter motor 103 via the belt 102 and the cutter carriage 200. Therefore, the upper movable blade 301 and the lower movable blade 302 are configured to be rotationally drivable by driving of the cutter motor 103.

In a case where the print medium 1 is cut, the print medium 1 is cut while the lower movable blade 302 and the upper movable blade 301, which is in contact with the lower movable blade, rotate together. In FIG. 2, the cutter unit 300 performs cutting from the first end portion 1a of a print medium to the second end portion 1b of the print medium. The first end portion 1a of the print medium is an end portion on the stand-by position P side of the cutter unit 300. After the print medium 1 is cut, the cutter carriage 200 is reversed at a predetermined reversing position and moves to a position which is the stand-by position P, in order to stand by for the next cutting operation. Note that, although the cutter unit 300 is mounted on the cutter carriage 200 in the example of the present embodiment, it is also possible that the cutter unit 300 is mounted on the carriage 3, on which the print head 2 is mounted, for example.

<Configuration of the Slitter>

The slitter 13 is disposed on the downstream side relative to the cutter 5 in the conveyance direction of the print medium 1. The slitter 13 includes the slitter unit 303 which is disposed in a movable manner on the slitter guide rail 307 extending in the X direction (see FIG. 2). This slitter unit 303 is movable to a given position in the X1 and X2 directions and is capable of cutting the print medium 1 along a direction parallel to the conveyance direction (the +Y direction) at the position after movement.

In the present embodiment, the slitter 13 has a configuration in which the two slitter units 303L and 303R are mounted. Note that the slitter units 303L and 303R are configured to be left-right reversals in the X1 and X2 directions with the same components. Therefore, in FIG. 2, the reference signs are mainly given to the components of the slitter unit 303L for the sake of simplification.

Figure 3A:
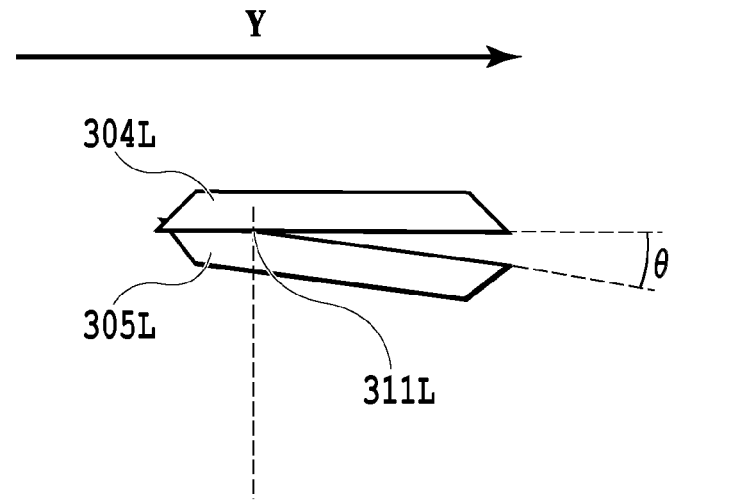
FIG. 3A and FIG. 3B are diagrams illustrating a relationship between an upper movable blade and a lower movable blade in a slitter unit.
Figure 3B:
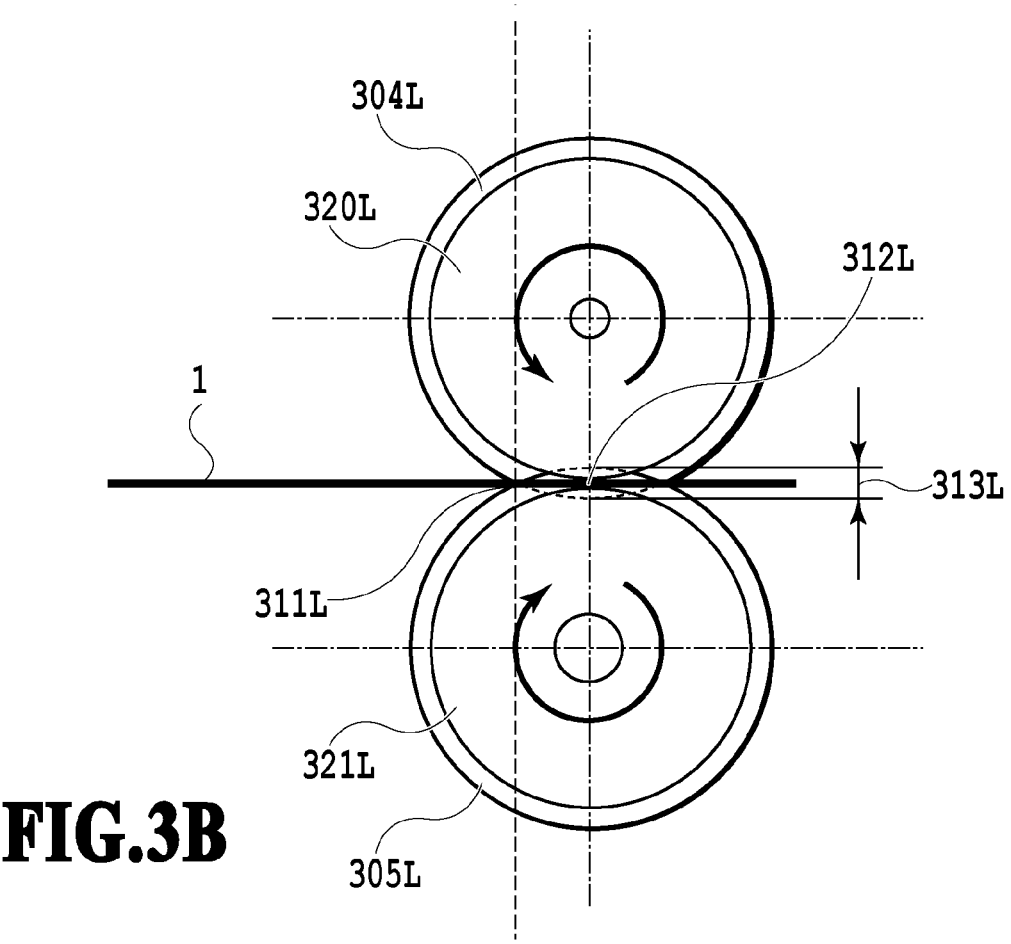
Figure 4:
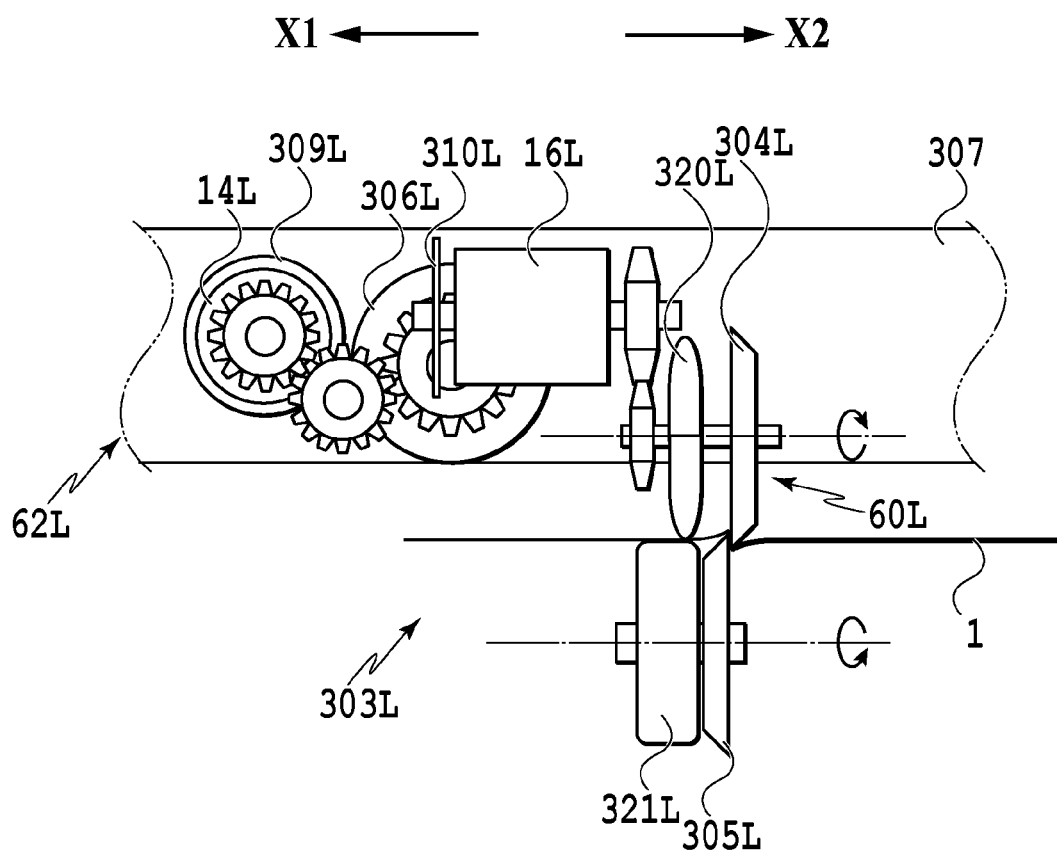
FIG. 4 is a diagram for explaining a configuration of the slitter unit.

FIG. 3A, FIG. 3B, and FIG. 4 are diagrams for explaining details of the slitter unit 303L. FIG. 3A is a plan view of the cutting part 60L of the slitter unit 303L, and FIG. 3B is a side view of the cutting part 60L. FIG. 4 is a front view of the slitter unit 303L.

The slitter unit 303L is equipped with the cutting part 60L, which cuts the print medium 1 along the Y direction, and the moving part 62L, which moves the cutting part 60L along the X direction (see FIG. 2). The cutting part 60L is equipped with the slitter upper movable blade 304L and the slitter lower movable blade 305L. The slitter upper movable blade 304L and the slitter lower movable blade 305L are respectively arranged so as to have the round-blade overlap amount 313L in the up-down direction (the Z direction) (see FIG. 3B) and have a predetermined amount of angle (the intersect angle) θ relative to the conveyance direction, which is the cutting direction (see FIG. 3A).

The print medium 1 is cut at the contact point 311L (see FIG. 3B) between the slitter upper movable blade 304L and the slitter lower movable blade 305L. The slitter upper movable blade 304L is connected to the slitter driving motor 16L via gears (see FIG. 4) and is rotated by driving of the slitter driving motor 16L. In a case where the slitter upper movable blade 304L is rotated by a driving force of the slitter driving motor 16L, the slitter upper conveyance roller 320L, which is connected coaxially with the slitter upper movable blade 304, rotates as well. The outer peripheral surface of the slitter upper conveyance roller 320L is in contact with the outer peripheral surface of the slitter lower conveyance roller 321L, which is connected coaxially with the slitter lower movable blade 305L, at the roller nip point 312L (see FIG. 3B).

Therefore, the slitter lower conveyance roller 321L is driven by friction transmission of the slitter upper conveyance roller 320L, and the slitter lower movable blade 305L rotates with driving of this slitter lower conveyance roller 321L. Therefore, with driving by such friction transmission as described above, the print medium 1 is conveyed by the slitter upper conveyance roller 320L and the slitter lower conveyance roller 321L, and the print medium 1 is cut in the conveyance direction while the upper and lower blades (304L, 305L) rotate together. Therefore, in the present embodiment, the conveyance roller 8, the slitter upper conveyance roller 320, etc., function as a conveyance unit that conveys a print medium in the conveyance direction.

The slitter driving motor 16L is equipped with the slitter driving encoder 310L, and the driving amount thereof can be controlled based on an output result of this slitter driving encoder 310L. The driving of the slitter driving motor 16L is controlled in synchronization with the conveyance roller 8.

Further, the moving part 62L is equipped with the slitter moving motor 14L and the slitter moving roller 306L. The slitter moving motor 14L is configured to be capable of transmitting a driving force to the slitter moving roller 306L via a gear. Note that the slitter moving motor 14L is equipped with the slitter moving encoder 309L, and the driving amount thereof is controlled by the control part 410, based on an output result of this slitter moving encoder 309L. That is, the movement position of the slitter unit 303L from the stand-by position is controlled based on an output result of the slitter moving encoder 309L.

The slitter moving roller 306L is disposed so as to be movable along the slitter guide rail 307 extending in the X direction. Specifically, the slitter moving roller 306L abuts on the slitter guide rail 307. Furthermore, if the slitter moving roller 306L is driven, the slitter unit 303L moves in the X1 and X2 directions by friction between the surface of the slitter moving roller 306L and the slitter guide rail 307. That is, the slitter upper movable blade 304L, the slitter lower movable blade 305L, the slitter upper conveyance roller 320L, and the slitter lower conveyance roller 321L are integrally movable along the slitter guide rail 307.

Although the movement mechanism of the moving part 62L is driving with friction of the slitter moving roller 306L in the present embodiment, it is also possible to have a rack and pinion configuration with the slitter moving roller 306 serving as a pinion and the slitter guide rail 307 serving as a rack.

In a case where the print medium 1 is cut by the slitter unit 303 having such a configuration as described above, firstly, the slitter units 303L and 303R are moved to the cutting positions. Further, the conveyance motor 51 that drives the conveyance roller 8 and the slitter driving motors 16L and 16R are driven, so that the print medium 1 is conveyed by the conveyance roller 8.

Next, if the leading edge of the print medium 1 conveyed by the conveyance roller 8 reaches the contact points 311L and 311R of the slitter 13, the print medium 1 is conveyed by the slitter upper conveyance rollers 320L and 320R and the slitter lower conveyance rollers 321L and 321R. Further, here, the print medium 1 is cut by the left and right slitter upper movable blades 304L and 304R and the slitter lower movable blades 305L and 305R. In this way, the print medium 1 is nipped and conveyed by the upper and lower rollers (320, 321) while being cut by the upper and lower blades (304, 305) and is discharged through the discharge guide 11.

The cutting by the slitter unit 303 can be executed in parallel with the printing operation. In this case, firstly, the slitter unit 303 is made to move from the stand-by positions to predetermined cutting positions in the X1 and X2 directions according to the setting by the user. Note that the predetermined cutting positions are positions according to the size of the product. Further, the conveyance motor 51 and the slitter driving motor 16 are driven, so that the print medium 1 is conveyed by the conveyance roller 8.

If the print medium 1 is conveyed to a position facing the print head 2, the image printing part moves the print head 2 in the X1 or X2 direction via the carriage 3 to perform a scanning corresponding one line, so that an image corresponding to one line is printed. Thereafter, the print medium 1 is conveyed by a predetermined amount by the conveyance roller 8 and the pinch roller 9. Then, scanning is performed with the print head 2 via the carriage 3, so that an image corresponding to one line is printed. If the printing proceeds by repeating the printing operation and the conveyance operation in this way and the leading edge of the print medium 1 reaches the contact points 311, the print medium 1 is cut by the slitter upper movable blades 304L and 304R and the slitter lower movable blades 305L and 305R that are rotating. Furthermore, the print medium 1 is nipped and conveyed by the slitter upper conveyance rollers 320L and 320R and the slitter lower conveyance rollers 321L and 321R while being cut.

Then, if the printing of the image is ended and the cutting by the slitter units 303 is ended, the slitter units 303 move to the predetermined stand-by positions, which are located in the vicinity of the first end portion 1a of the print medium and the second end portion 1b of the print medium, for example. Thereafter, the print medium 1 is conveyed to a cutting position, at which the cutting by the cutter unit 300 can be performed, and cut in the X direction by the cutter unit 300, and then the cut section is discharged through the discharge guide 11.

Note that the configuration of the slitter 13 described above is merely an example. That is, the slitter 13 may have any configuration as long as the slitter 13 is movable in the width direction of the print medium 1 and is capable of cutting the conveyed print medium 1 in the conveyance direction at a given position of the width direction. For example, there may be a form in which the slitter upper conveyance rollers 320 and the slitter lower conveyance rollers 321 and the slitter upper movable blades 304 and the slitter lower movable blades 305 are separately driven. Further, it is also possible that a driving source is not included and the movement to the cutting position is manually performed and that the cutting part 60 is configured with a fixed flat blade.

<Control Configuration of the Printing Apparatus>

Figure 5:
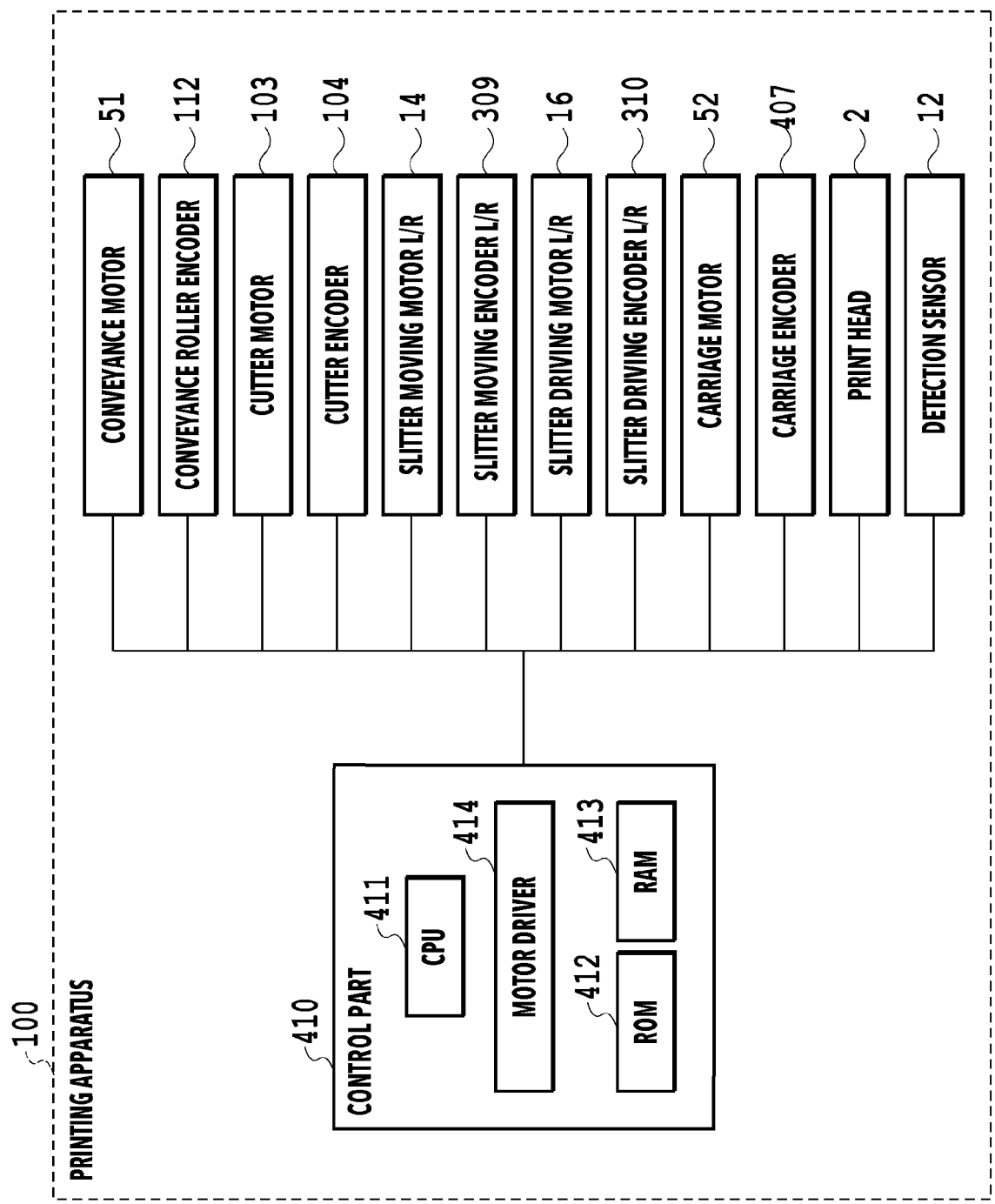
FIG. 5 is a block configuration diagram of a control system of the printing apparatus.

FIG. 5 is a block configuration diagram of a control system of the printing apparatus 100. The printing apparatus 100 is equipped with the control part 410 for controlling the overall operation of the apparatus. The control part 410 is equipped with the CPU 411, the ROM 412, the RAM 413, and the motor driver 414.

The control part 410 controls the conveyance motor 51 that drives the conveyance roller 8, the cutter motor 103 that drives the cutter 5, the slitter moving motor 14 that moves the slitter 13, and the slitter driving motor 16 that drives the cutting part 60 of the slitter 13. Further, the control part 410 controls the carriage motor 52 that moves the carriage 3, the conveyance roller encoder 112 that detects the driving amount of the conveyance motor 51, and the cutter encoder 104 that detects the driving amount of the cutter motor 103. Further, the control part 410 controls the slitter moving encoder 309 that detects the driving amount of the slitter moving motor 14 and the slitter driving encoder 310 that detects the driving amount of the slitter driving motor 16. Furthermore, the control part 410 controls driving of the carriage encoder 407 for detecting the position of the carriage 3, the print head 2 that applies ink to the print medium 1, and the detection sensor 12. That is, the control part 410 controls each motor and the print head 2, based on signals obtained from each encoder, sensor, etc.

<Print Processing>

As described above, the printing apparatus 100 has a configuration in which a predetermined position in the width direction (the X direction) of the print medium 1 on which an image is printed can be cut by the slitter 13. Therefore, in the printing apparatus 100, what is termed as a marginless printing can be performed by cutting the inside of both X-direction end portions of an image print area, in which an image to be left as a product is printed, with the slitter 13 with respect to the width direction, for example. Compared with a case in which marginless printing is performed by a printing apparatus that is not equipped with the slitter 13, it is possible for the printing apparatus 100 to greatly suppress ink adherence to the platen 10 since it is not necessary to apply ink so that the ink protrudes from the print medium 1.

In this way, in the printing apparatus 100, it is possible to select either "width-margin printing" or "marginless printing" via an operation part (not illustrated in the drawings) disposed in the printing apparatus 100, a host apparatus (not illustrated in the drawings) connected to the printing apparatus 100, or the like. In a case where "marginless printing" is selected, the width-direction end portions of the image print area, i.e, the printed image, will be cut by the slitter 13. On the other hand, in a case were "width-margin printing" is selected, sections where the image is not printed, which are separated in the width direction by a predetermined amount from the printed image, i.e., the image print area, will be cut by the slitter 13.

By the way, if the amount of ink applied to the print medium at the time of printing an image is large, a phenomenon in which the print medium floats from the platen, i.e., what is termed as "floating", occurs. In the print medium in such a state where floating occurs, the print medium undulates in the height direction over the width direction, so that the width-direction end portions of the image printed on the print medium tend to be pulled toward the center side in the width direction, compared to a case where floating is not occurring. Therefore, if floating occurs to the print medium, the cutting positions of the print medium with respect to the width direction may change to the outside of the expected positions. In particular, such a change is remarkable in a range of a predetermined length in the conveyance direction from the cutting start position of the print medium, and there has been a possibility that the print medium is cut wider than expected. As a result, especially in a case of marginless printing, there has been a possibility that a margin adjacent to a part of the width-direction edge portions of the printed image is generated.

Figure 6A:
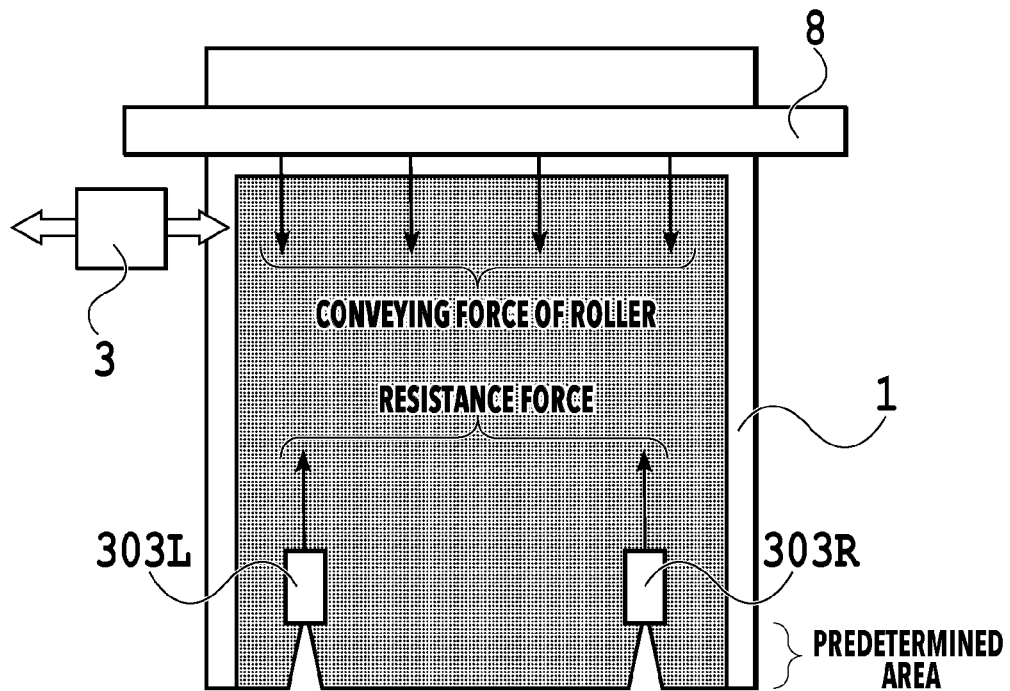
FIG. 6A and FIG. 6B are diagrams for explaining floating that occurs to a print medium.
Figure 6B:
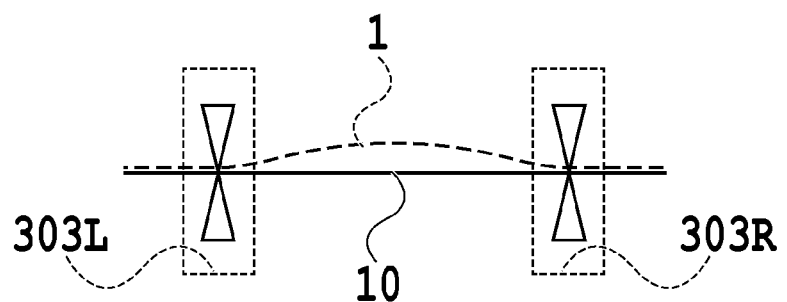

FIG. 6A and FIG. 6B are diagrams for explaining floating of the print medium that occurs at the time of marginless printing. FIG. 6A is a diagram for explaining a resistance force generated by the slitter unit 303 in a case where marginless printing is executed. FIG. 6B is a diagram for explaining floating of a print medium due to the resistance force generated by the slitter unit 303.

In the case of marginless printing, a resistance force in the −Y direction is generated by the slitter unit 303 to the print medium 1 in relation to the conveyance amount of the print medium 1 in the +Y direction at the time of the cutting by the slitter unit 303 (see FIG. 6A). In particular, in the leading edge area including the cutting start position in a predetermined area from the start of cutting of the print medium 1, the force with which the print medium 1 sticks to the platen 10 is weak, and an entering resistance force is generated when the leading edge of the print medium enters the cutting part 60 of the slitter unit 303. Therefore, at the time of cutting the above-described predetermined area of the print medium 1, floating of the print medium is more likely to occur as illustrated in FIG. 6B. Due to the floating occurring to the print medium, the print medium 1 is pulled toward the central section thereof in the width direction. Accordingly, when the slitter unit 303 cuts the floating area of the print medium 1 along the Y direction, the area is cut wider in the width direction (the X direction). Noted that such floating that occurs to a print medium becomes more remarkable as the rigidity of the print medium 1 is lower.

Figure 7A:
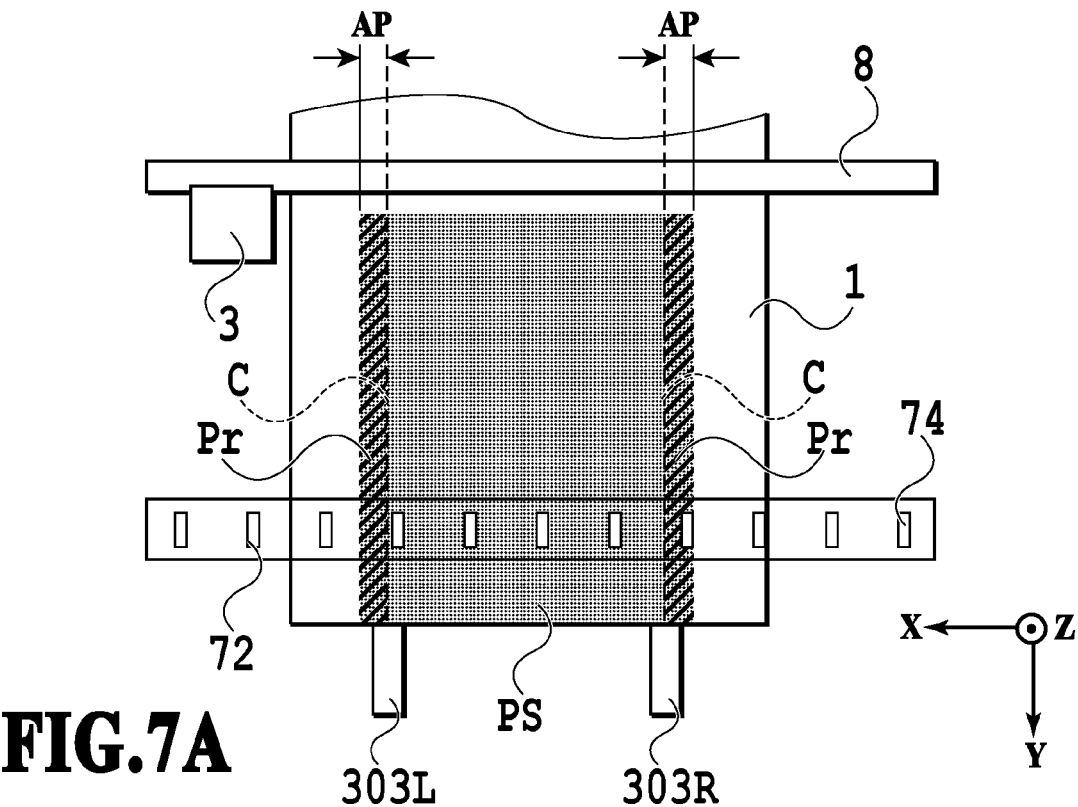
FIG. 7A and FIG. 7B are diagrams for explaining a protruding amount of an image print area which is cut at the time of marginless printing.
Figure 7B:
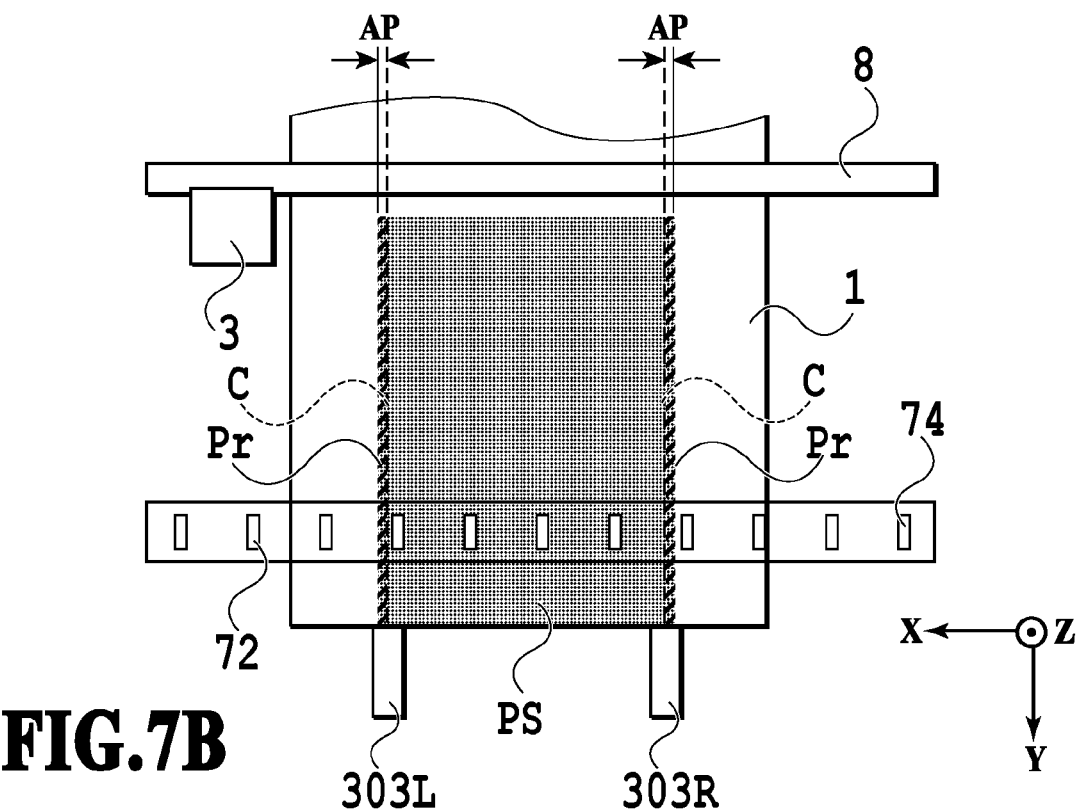

By the way, as in FIG. 7A, with respect to the width direction of the print medium 1, the slitter unit 303 of the printing apparatus 100 cuts the inside of the image print area PS, which is printed with application of ink by the print head 2, at the time of marginless printing. FIG. 7A and FIG. 7B are diagrams illustrating the relationship between the image print area PS and the cutting lines C to be cut by the slitter unit 303 at the time of marginless printing. The protruding sections Pr located outside the cutting lines C of the image print area PS are unnecessary for the product. Therefore, for the purpose of suppressing the amount of ink used during printing, the size of the image print area PS will be adjusted (see FIG. 7B) so that an amount of the protruding sections Pr in the width direction, i.e., the protruding amount AP, becomes smaller in the image print area PS.

Here, if ink is applied to the print medium 1, the liquid component of the ink permeates the print medium 1, and thus the rigidity (stiffness) decreases. Such a decrease in rigidity of the print medium 1 becomes greater with an increase in the ink application amount, for example, with an increase in the printing duty indicating the ink application amount per unit area. The floating that occurs to the print medium 1 becomes more remarkable with a decrease in rigidity of the print medium 1 as described above and tends to occur to the leading edge side of the print medium. Therefore, if the protruding amount AP of the image print area PS is adjusted to be small, the outside of an expected position in the width direction may be cut in the area on the leading edge side of the print medium 1 where floating is likely to occur. Therefore, there is a possibility that the cutting lines C are located outside the image print area PS on the leading edge side of the print medium, and thus a margin adjacent to a width-direction end portion of the image is formed, so that a product having no margin around the image cannot be obtained at the time of marginless printing.

Figure 8:
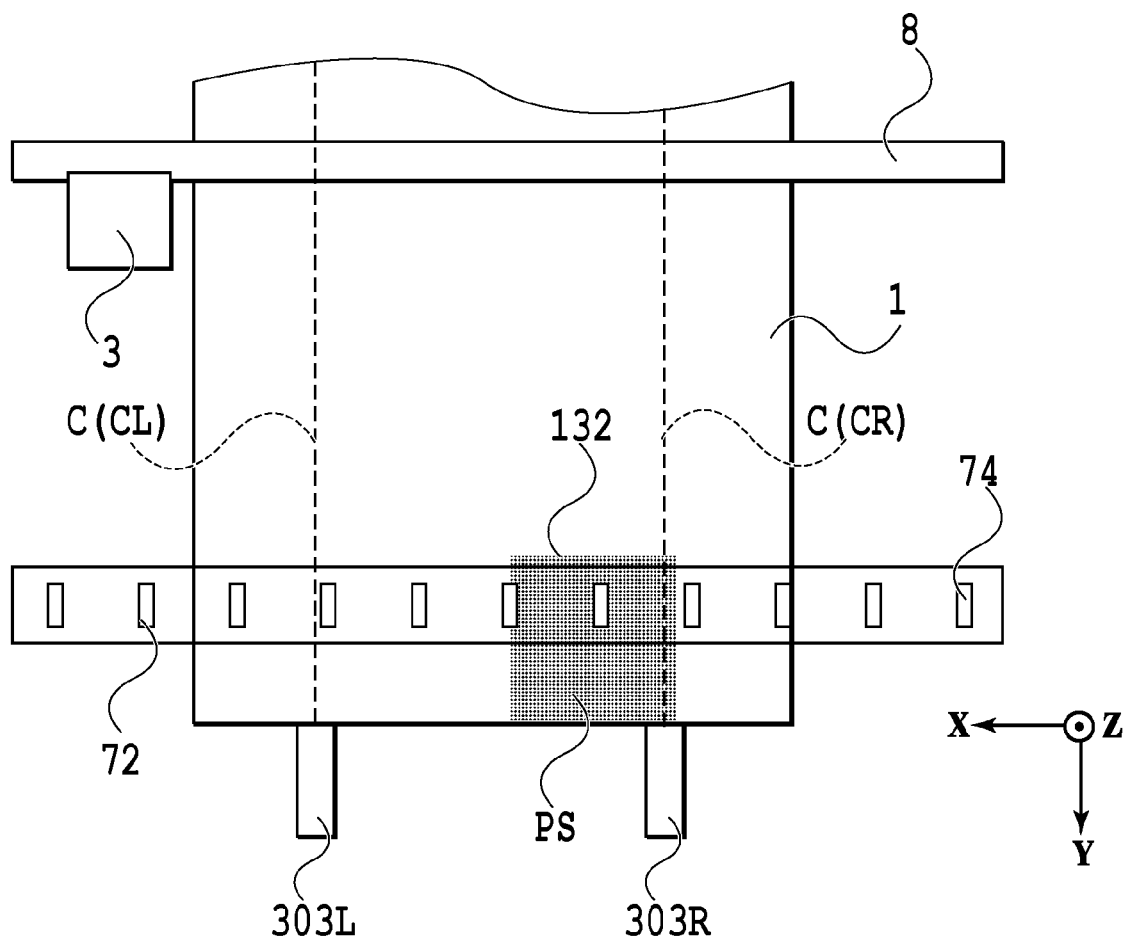
FIG. 8 is a diagram illustrating an example of the image print area when floating occurs to the print medium.

Such a phenomenon similarly occurs in a case where an image is printed so as to be off-centered to one side in the width direction as illustrated in FIG. 8, not only in a case where an image is printed on the entire area between the slitter units 303L and 303R as illustrated in FIG. 7B. FIG. 8 is a diagram illustrating a case in which the image print area PS is located on the slitter unit 303R side. That is, even in a case where the image print area PS has a predetermined area St extending in the X direction and Y direction and is located on the cutting line CR of the slitter unit 303R, a margin is more likely to occur on the cutting line CR side of the product with an increase in the ink application amount. Note that, in an experiment performed by the inventors of the present application, such a phenomenon was observed in the image print area PS of 10 cm×10 cm with the ink application amount being the printing duty of about 150%, although there should be some errors depending on the conditions. The printing duty is defined as 100% in a state where one 4 pl ink droplet is printed on a 1200 dpi grid.

Therefore, in the present embodiment, regarding the leading edge side where the print medium 1 enters the slitter unit 303, the ink application amounts of edge portions on both width-direction ends of a printed image are obtained. Further, the size of the image print area is changed by adjusting the size of the image to be printed according to the obtained ink application amounts, so as to suppress occurrence of a margin adjacent to a width-direction end portion of the image at the time of marginless printing.

Figure 9:
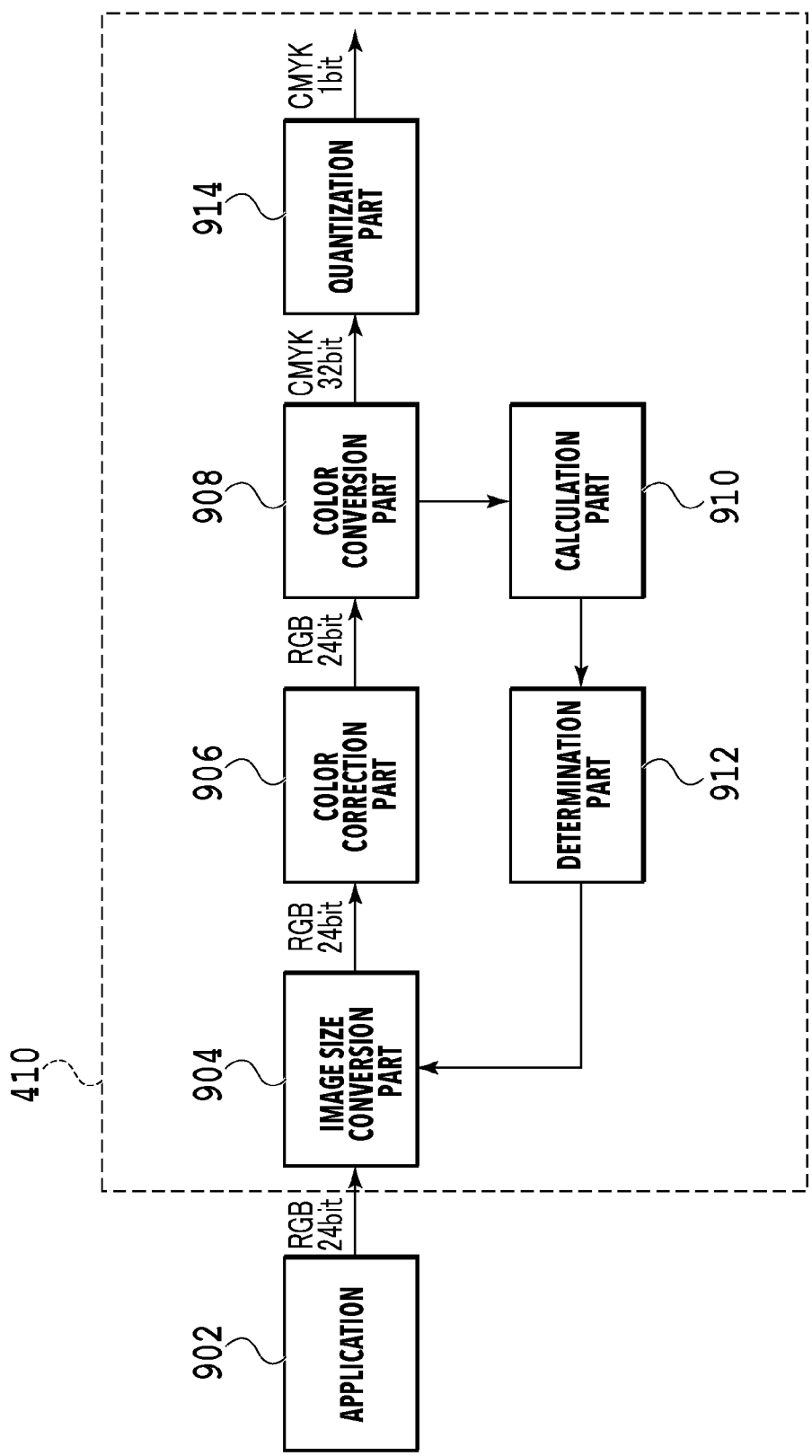
FIG. 9 is a block diagram of a functional configuration related to image processing performed by a control unit.
Figure 10:
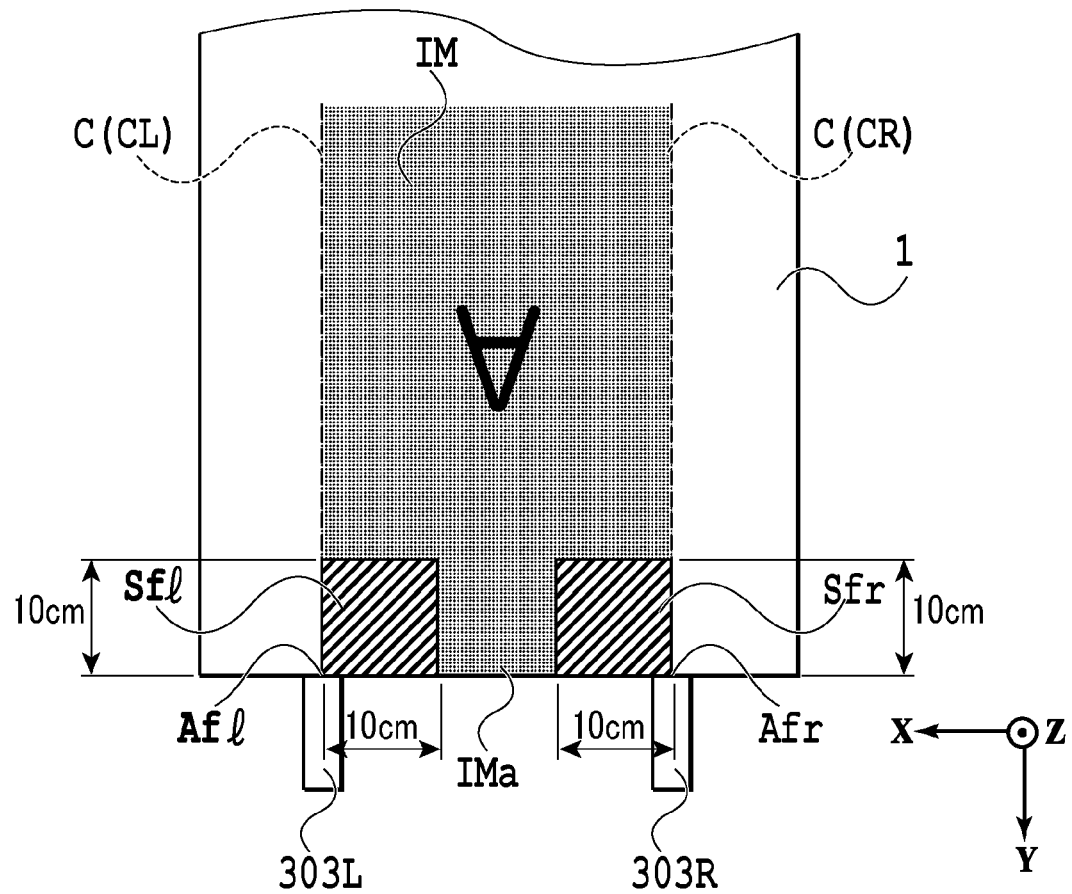
FIG. 10 is a diagram for explaining an edge portion of an image for calculating an ink application amount.

Hereinafter, the print processing executed by the printing apparatus 100 will be explained in detail. First, a functional configuration of the control part 410 for the image processing to be executed in the print processing will be explained. FIG. 9 is a block diagram illustrating a functional configuration related to the image processing in the control part 410. FIG. 10 is a diagram illustrating edge portions for calculating ink application amounts.

Image data is input to the control part 410 from the application 902 in a host apparatus or the like. The image data is output from the application 902 as data of a total of 24 bits, i.e., 8 bits each for RGB. The application 902 outputs image data having a resolution required for each of the preliminary image processing and the image processing for printing, which will be described later. Specifically, the low-resolution image data to be used in the preliminary image processing and the high-resolution image data to be used in the image processing for printing in the later-described print processing are output. In the present embodiment, image data having a resolution of 150 dpi is output in the preliminary image processing, and image data having a resolution of 600 dpi, which is required for printing, is output in the image processing for printing. Note that it is also possible that only the high-resolution image data is output from the application 902 and the control part 410 generates the low-resolution image data from the high-resolution image data.

The control part 410 is equipped with the image size conversion part 904 that enlarges image data, based on an enlargement rate that is determined by the later-described determination part 912, and the color correction part 906 that performs color correction suitable to an image data characteristic such as graphic-like or photograph-like. Further, the control part 410 is equipped with the color conversion part 908 that converts image data in an RGB format into data of a total of 32 bits, i.e., 8 bits each for CMYK, which are ink colors to be used in the printing apparatus 100. Further, the control part 410 is equipped with the calculation part 910, which calculates the average ink application amounts of the edge portions Sfl and Sfr in the image from the obtained CMYK data, and the determination part 912, which determines the enlargement rate of the image, based on the obtained ink application amount. Furthermore, the control part 410 is equipped with the quantization part 914 that converts the data of 8 bits each for CMYK, which is converted by the color conversion part 908, into binary data representing ejection or non-ejection of ink from the print head 2. The binarization processing used in the quantization part 914 may be an error diffusion processing or a dither processing. The functions of each of these configurations are implemented by, for example, the CPU 411. In the present embodiment, the control part 410 functions as an image processing unit that obtains data for printing from image data.

The edge portions Sfl and Sfr are areas having predetermined areas at the width-direction end portions on the leading edge side of an image. The leading edge of an image is an end portion (end side) of an image located on the downstream side in the conveyance direction of the print medium 1 when printing is performed based on image data. The edge portion Sfl is located at a width-direction end portion on one side (the left side in FIG. 10) of the image IM and is an area including the end side IMa on the leading edge side of the image IM. Further, the edge portion Sfl is a rectangular area of, for example, 10 cm in the −X direction and 10 cm in the −Y direction from the corner portion Afl on one side (the left side in FIG. 10) on the leading edge side of the image IM. The edge portion Sfr is located at a width-direction end portion on the other side (the right side in FIG. 10) of the image IM and is an area including the end side IMa on the leading edge side of the image IM. Further, the edge portion Sfr is a rectangular area of, for example, 10 cm in the +X direction and 10 cm in the −Y direction from the corner portion Afr on the other side (the right side in FIG. 10) on the leading edge side of the image IM.

Therefore, at the time of marginless printing, the edge portion Sfl in the image printed on the print medium 1 is formed so as to include the entering position where the print medium 1 enters the slitter unit 303L and include a predetermined length of the cutting line CL from the entering position in the conveyance direction. Note that the cutting line CL is a linear cutting section which is formed on the print medium 1 by cutting with the slitter unit 303L. Further, at the time of marginless printing, the edge portion Sfr is formed so as to include the entering position where the print medium 1 enters the slitter unit 303R and include a predetermined length of the cutting line CR from the entering position in the conveyance direction. Note that the cutting line CR is a linear cutting section which is formed on the print medium 1 by cutting with the slitter unit 303R.

When obtaining the ink application amounts of the edge portions Sfl and Sfr, the CMYK data obtained by the color conversion part 908 is used. More specifically, each of the 8-bit values of CMYK in the CMYK data obtained by the color conversion part 908 represents an ink application amount of each ink color, i.e., a printing duty. That is, as for each 8-bit value for CMYK, i.e., 0 to 255, "0" represents the ink application amount of 0%, "255" represents the ink application amount of 100%, and an intermediate value between 0 and 255 represents an ink application amount proportional to the intermediate value. Further, the calculation part 910 calculates the ink application amounts of the edge portions Sfl and Sfr by summing up the ink application amounts of the four colors of CMYK, which are obtained from the CMYK data obtained by the color conversion part 908. For example, if C is equal to 255, M is equal to 255, Y is equal to 0, and K is equal to 0, the ink application amount is 200% (100%+100%+0%+0%). Then, the determination part 912 compares the average ink application amounts of the edge portions Sfl and Sfr obtained by the calculation part 910 with a threshold value, so as to determine the enlargement rate of the image according to the result of this comparison. The above-described threshold value Th1 and enlargement rate are set according to the type of print medium, a characteristic of ink, an external environment, etc.

Figure 11:
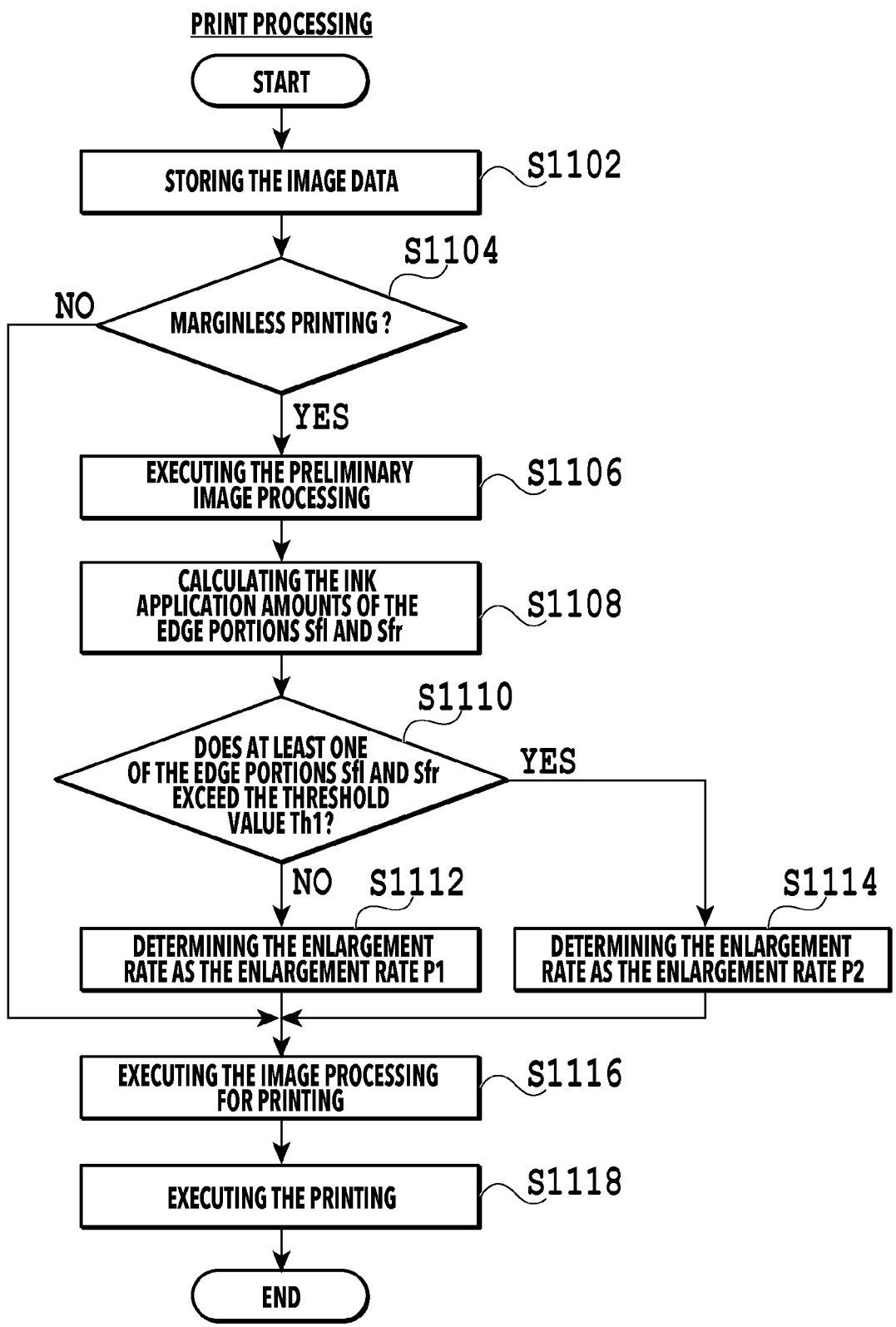
FIG. 11 is a flowchart illustrating a detailed processing routine of print processing.

Next, the specific details of the print processing to be executed by the printing apparatus 100 according to the first embodiment will be explained. FIG. 11 is a flowchart illustrating the details of the print processing to be executed by the printing apparatus 100 according to the first embodiment. The series of the processes illustrated in the flowchart of FIG. 11 is performed by the CPU 411 loading a program code stored in the ROM 412 into the RAM 413 and executing the program code. Alternatively, a part or all of the functions in the steps of FIG. 11 may be executed by hardware such as an ASIC or an electronic circuit. Note that the reference sign "S" in the explanation of each process means that it is a step of the flowchart.

If a job is input from a host apparatus to the printing apparatus 100 together with an instruction to start printing, the CPU 411 holds image data included in the input job data in a storage area such as the RAM 413 (S1102). Here, high-resolution image data and low-resolution image data are held in the storage area. Then, the CPU 411 determines whether or not the printing instructed to start is marginless printing (S1104). Whether or not the printing is marginless printing may be included in the job data, for example, and, in a case where width-margin printing or marginless printing is not set at the point in time of performing this process, it is also possible to prompt the user to perform the setting by displaying as such on a host apparatus, an operation part, or the like.

If it is determined in S1104 that the printing is not marginless printing, that is, the printing is width-margin printing, the processing proceeds to S1116, which will be described later. Further, if it is determined in S1104 that the printing is marginless printing, the CPU 411 executes the preliminary image processing on the low-resolution image data (S1106). That is, in S1106, the color correction part 906 performs color correction suitable to the characteristics of the image data, and the color conversion part 908 converts the image data (RGB data) into the ink color data (CMYK data) to be used by the printing apparatus 100. Since the purpose of this preliminary image processing is to obtain the average ink application amounts of the areas in the vicinity of the cutting lines to be cut by the slitter units 303, the low-resolution image data is utilized so that the process load is reduced.

Next, the CPU 411 calculates the average ink application amounts of the edge portions Sfl and Sfr (S1108). That is, in S1108, the calculation part 910 calculates the average ink application amounts of the edge portions Sfl and Sfr, based on the data obtained by the preliminary image processing of S1106. In the present embodiment, the calculation part 910 functions as a calculation unit that calculates the ink application amount of an area provided at a width-direction end portion on the leading edge side of an image.

Thereafter, the CPU 411 determines whether or not at least one of the average ink application amounts of the edge portions Sfl and Sfr exceeds the threshold value Th1 (S1110). The threshold value Th1 is the lower limit value of ink application amount that causes floating of the print medium 1 or a value that is less than the lower limit value by a predetermined amount. More specifically, the threshold value Th1 is the lower limit value of ink application amount that causes floating of the print medium 1, which may generate a margin adjacent to a width-direction end portion of an image during marginless printing, or a value that is less than the lower limit value by a predetermined amount, for example. In the present embodiment, the threshold value Th1 is set to a printing duty of 150%.

Then, if it is determined in S1110 that both of the ink application amounts of the edge portions Sfl and Sfr do not exceed the threshold value Th1, the CPU 411 determines the enlargement rate as the enlargement rate P1, with which floating that occurs to the print medium is ignored (S1112). That is, if it is determined that both of the ink application amounts of the edge portions Sfl and Sfr are equal to or less than the threshold value Th1, floating does not occur to the print medium or the floating that occurs to the print medium can be ignored, and thus the determination part 912 determines the enlargement rate as the enlargement rate P1, with which the protruding amount becomes about 1 mm.

Specifically, for example, it is assumed that the size of the image to be a product is 210 mm in the X direction and 297 mm in the Y direction, which is the same size as A4 size. In this case, the image size of the product is enlarged by 1 mm in each of the +X direction and the −X direction, and thus the size of the enlarged image (that is, the size of the image print area) in the X direction becomes 212 mm. Therefore, the enlargement rate P1 is 101% ($\approx$212/210). Note that, since the enlargement rate at the time of marginless printing is for enlarging not only in the X direction but also in the Y direction at the same ratio, the image size of the enlarged image in the Y direction becomes 300 mm ($\approx$297×101%). In this case, the enlargement rate P1 may be different depending on the size of the product or may be the same.

On the other hand, if it is determined in S1110 that at least one of the ink application amounts of the edge portions Sfl and Sfr exceeds the threshold value Th1, the CPU 411 determines the enlargement rate as the enlargement rate P2, with which floating that occurs to the print medium is taken into consideration (S1114). Note that the enlargement rate P2 is a greater value than the enlargement rate P1. That is, if it is determined that at least one of the ink application amounts of the edge portions Sfl and Sfr exceeds the threshold value Th1, there is a possibility that the cutting positions to be cut by the slitter units 303 are located outside the assumed positions. Therefore, at the time of marginless printing, there is a possibility that a margin adjacent to an width-direction end portion of the image is formed in the product due to the floating that occurred to the print medium 1. Therefore, the determination part 912 determines the enlargement rate as the enlargement rate P2 with which the protruding amount becomes about 4 mm.

Specifically, if it is assumed that the size of the image to be the product is the same as A4 size, the size of the enlarged image in the X direction becomes 218 mm since the image size of the product is enlarged by 4 mm each in the +X direction and the −X direction. Therefore, the enlargement rate P2 is 104% ($\approx$218/210), and the size of the enlarged image in the Y direction becomes 309($\approx$297×104) mm. Note that the processes of S1110 to S1114 are executed by the determination part 912, which is a functional configuration of the control part 410 illustrated in FIG. 9. As with the enlargement rate P1, the enlargement rate P2 may be different depending on the size of the product or may be the same.

If the enlargement rate is determined in this way, the CPU 411 executes the image processing for printing on the high-resolution image data (S1116). That is, in S1114, the image size conversion part 904 enlarges the high-resolution image data at the determined enlargement rate, and the color conversion part 908 converts the RGB data of the enlarged image data to CMYK data via the color correction part 906. Then, for the converted CMYK data, the quantization part 914 obtains binary data representing ejection or non-ejection of ink from the print head 2. In the present embodiment, the image size conversion part 904 functions as an enlargement unit that enlarges image data, based on a calculation result of the calculation part 910. Further, the color correction part 906, the color conversion part 908, and the quantization part 914 function as a creation unit that creates binary data by performing image processing on image data.

After it is determined in S1104 that the printing is not marginless printing, the binary data is obtained in S1116 without enlarging the image data. Further, after it is determined in S1104 that the printing is marginless printing, the binary data is obtained in S1116 by enlarging the image data at the enlargement rate determined in S1112 or S1114.

Thereafter, the CPU 411 performs printing by use of the obtained binary data (S1118), and ends the print processing. That is, in S1118, firstly, the cutting positions at which the slitter units 303 cut the print medium 1 are obtained from the job data, etc., and the conveyance profile is set. The conveyance profile is stored in advance. The cutting positions to be obtained are set according to the size of the product. Next, the slitter units 303 are moved to the obtained cutting positions, and the slitter driving motors 16 and the conveyance motor 51 are driven. Then, the print medium 1 is conveyed to the conveyance start position by the conveyance roller 8, and printing is performed on the print medium located at the conveyance start position while scanning is performed on the print medium 1 via the carriage 3 in the X direction. When the printing by the scanning is ended, the print medium 1 is conveyed by the conveyance roller 8 by a predetermined amount, and then the printing is performed on the print medium 1 via the carriage 3. Such a printing operation and a conveyance operation are alternately and repeatedly executed to perform printing, and, if it is determined that the printing is ended, the print medium 1 is moved to the position to be cut by the cutter 5. If the print medium 1 is moved to the position to be cut by the cutter 5, the slitter driving motors 16 and the conveyance motor 51 are stopped, then the print medium 1 is cut in the X direction by the cutter 5, and then the product is discharged.

As explained above, in the printing apparatus 100 according to the first embodiment, the ink application amounts of edge portions which are located at the entering positions, where the print medium 1 enters the slitter units 303, on both width-direction ends on the leading edge side of the image at the time of marginless printing. Further, if at least one of the two obtained ink application amounts exceeds a threshold value, which is a judgment standard of occurrence of floating with which a margin adjacent to a width-direction end portion of the image is generated at the time of marginless printing, the enlargement rate of the image is increased.

Accordingly, in the printing apparatus 100 according to the first embodiment, if it is determined that floating with which a margin adjacent to the image in the width direction is formed may occur to the print medium 1 at the time of marginless printing according to the ink application amounts in the two edge portions, the protruding amount of the image print area is increased. Therefore, even though floating occurs to the leading edge of the print medium, which is relatively prone to float, it is possible to suppress occurrence of a margin adjacent to a width-direction end portion in a predetermined area including the leading edge.

Second Embodiment

Next, with reference to FIG. 12 through FIG. 17, an explanation will be given of a printing apparatus according to the second embodiment. Note that, in the following explanation, the same or corresponding configurations as those of the first embodiment described above are assigned with the same reference signs as those used in the first embodiment, so as to omit the detailed explanations thereof.

The printing apparatus 100 according to the second embodiment is different from the above-described first embodiment in the aspects below. That is, in the printing apparatus 100 according to the second embodiment, edge portions for obtaining ink application amounts of an image are provided not only on the leading edge side of the image but also on the rear edge side, so that the enlargement rate of the image is changed and the image is rotated according to the ink application amounts of these end portions.

Figure 12:
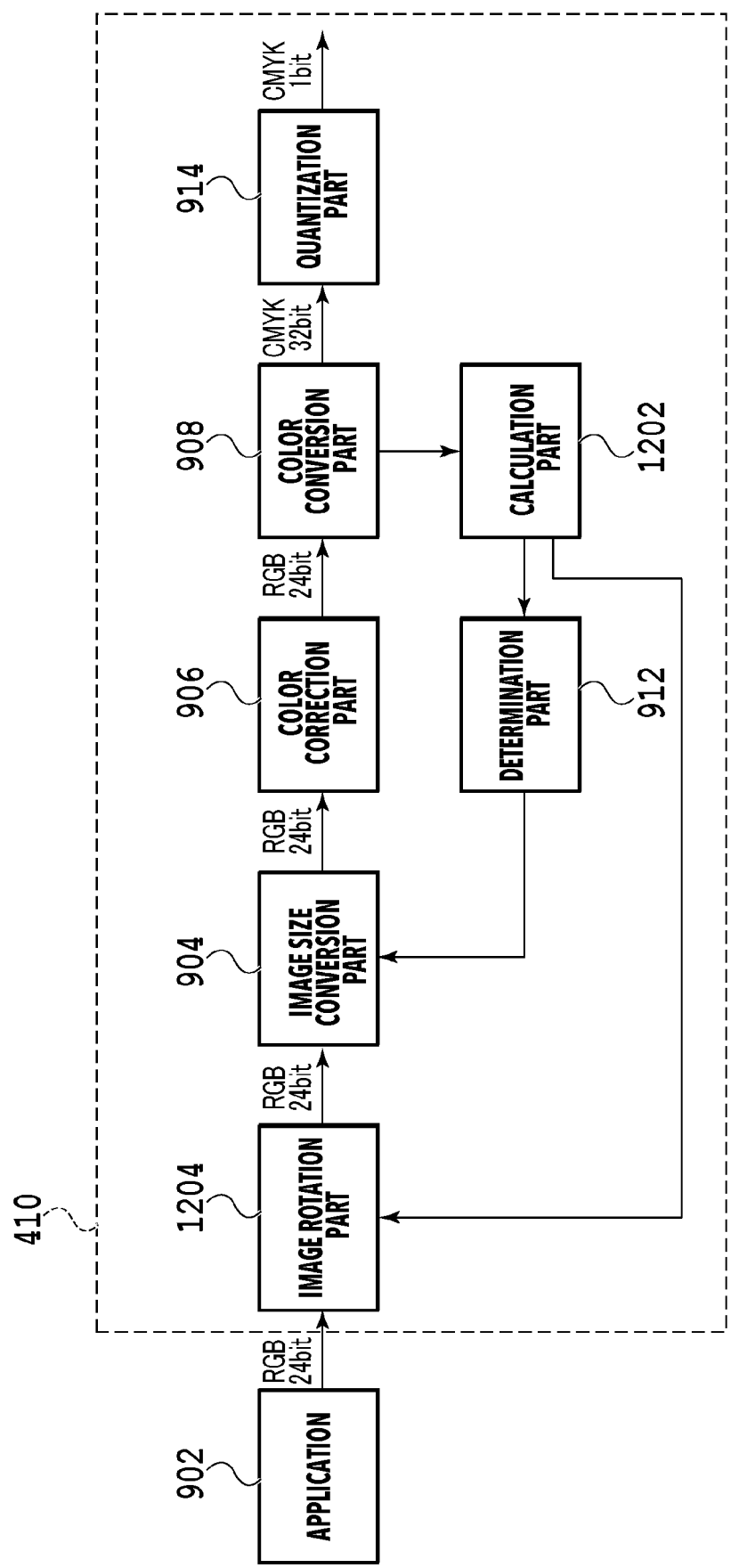
FIG. 12 is a block diagram of a functional configuration related to image processing performed by a control unit according to a different embodiment.
Figure 13:
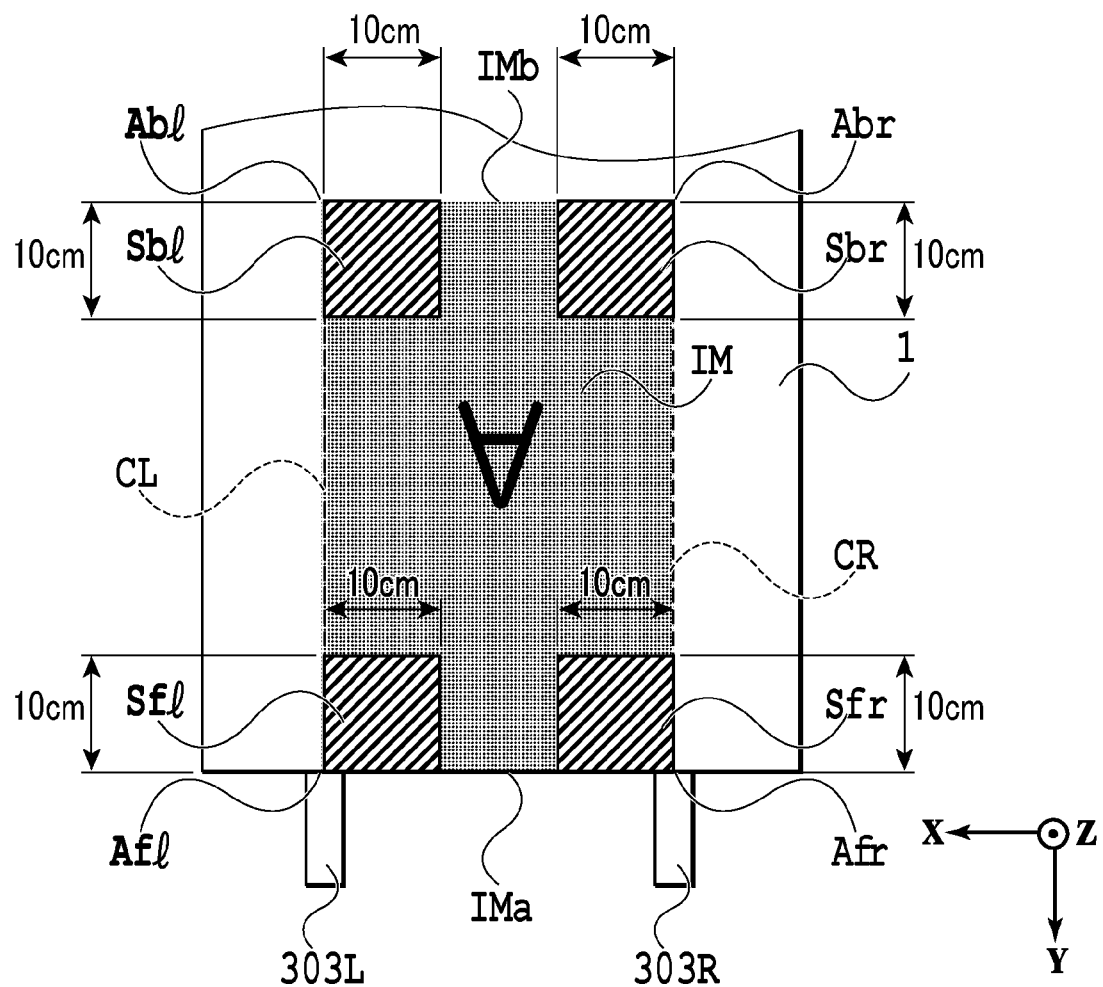
FIG. 13 is a diagram for explaining an edge portion of an image for calculating an ink application amount according to the different embodiment.
Figure 14:
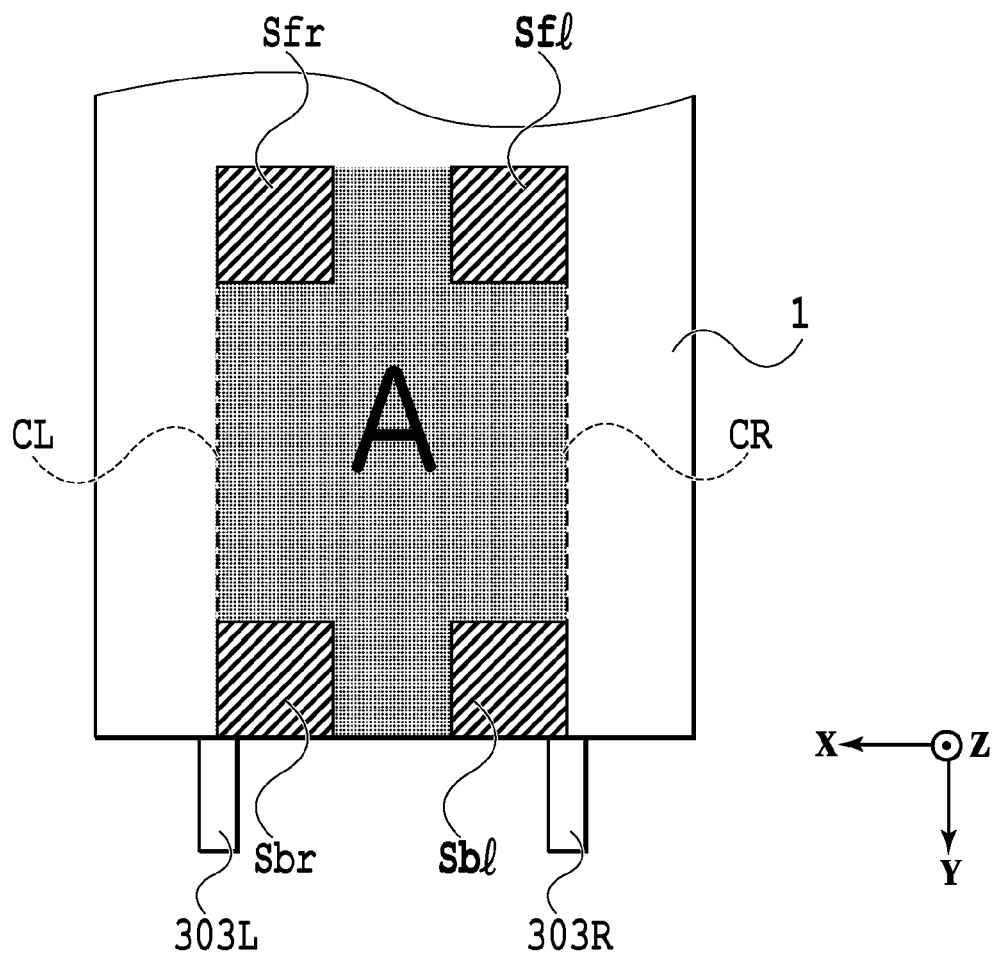
FIG. 14 is a diagram when the image is rotated by 180°.

FIG. 12 is a block diagram illustrating a functional configuration related to the image processing in the control part 410. FIG. 13 is a diagram for explaining an edge portion of an image for obtaining an ink application amount. FIG. 14 is a diagram illustrating an image to be printed on the print medium 1, based on rotated image data. Note that, in FIG. 12, the same configurations as the configurations explained in FIG. 9 are illustrated using the same reference signs. In the following explanation, detailed explanations of the configurations illustrated with the same reference signs as in FIG. 9 will be omitted as appropriate.

In the printing apparatus 100 of the second embodiment, the control part 410 is equipped with the image size conversion part 904, the color correction part 906, the color conversion part 908, the determination part 912, And the quantization part 914. In addition, the control part 410 is further equipped with the calculation part 1202, which calculates the ink application amounts of edge portions provided at the four corners of an image, and the image rotation part 1204, which rotates the high-resolution image data by 180° according to a calculation result of the calculation part 1202. The functions of each of these configurations are implemented by, for example, the CPU 411. In the present embodiment, the control part 410 functions as an image processing unit that obtains data for printing from image data.

More specifically, the calculation part 1202 calculates the average ink application amounts in the total of four areas, i.e., the edge portions Sbl and Sbr as well as the edge portions Sfl and Sfr (see FIG. 13). Since the method for obtaining the ink application amount of each edge portion in the calculation part 1202 is the same as that in the calculation part 910 and the edge portions Sfl and Sfr are the same as those in the first embodiment, detailed explanations thereof will be omitted. The edge portions Sbl and Sbr are rectangular areas having predetermined areas at the width-direction end portions on the rear edge side of an image. The rear edge of an image is an end portion (end side) of an image located on the upstream side in the conveyance direction of the print medium 1 if printing is performed based on image data.

The edge portion Sbl is located at a width-direction end portion on one side (the left side in FIG. 13) of the image IM and is an area including the end side IMb on the rear edge side of the image IM. Further, the edge portion Sbl is a rectangular area of, for example, 10 cm in the −X direction and 10 cm in the +Y direction from the corner portion Abl on one side (the left side in FIG. 13) on the rear edge side of the image IM. The edge portion Sbr is located at a width-direction end portion on the other side (the right side in FIG. 13) of the image IM and is an area including the end side IMb on the rear edge side of the image IM. Further, the edge portion Sbr is a rectangular area of, for example, 10 cm in the +X direction and 10 cm in the +Y direction from the corner portion Abr on the other side (the right side in FIG. 13) on the rear edge side of the image IM.

Therefore, at the time of marginless printing, the edge portion Sbl in the image printed on the print medium 1 is formed so as to include the position where the slitter unit 303L is dislodged and a predetermined length of the cutting line CL from that position in the conveyance direction. Further, at the time of marginless printing, the edge portion Sbr is formed so as to include the position where the slitter unit 303R is dislodged and a predetermined length of the cutting line CR from that position in the conveyance direction.

The image rotation part 1204 compares the calculation result obtained by calculation of the calculation part 1202 with the threshold value Th1, so as to rotate image data, based on this comparison result. Specifically, only in a case where at least one of the ink application amounts of the edge portions Sfl and Sfr exceeds the threshold value Th1 and both of the ink application amounts of the edge portions Sbl and Sbr do not exceed the threshold value Th1, the image data will be rotated by 180°. As illustrated in FIG. 14, in the image printed based on the image data rotated by 180° in this way, the edge portions Sbl and Sbr, whose ink application amounts are equal to or less than the threshold value Th1, are located on the leading edge side of the print medium 1. Accordingly, at the time of marginless printing, the entering positions where the print medium 1 enters the slitter units 303L and 303R are respectively included in the edge portions Sbl and Sbr, whose ink application amounts are equal to or less than the threshold value Th1. In this case, floating is less likely to occur on the leading edge side of the print medium that enters the slitter units 303, so that occurrence of a margin adjacent to a width-direction end portion of the image is suppressed during marginless printing.

The determination part 912 determines the enlargement rate of the image as the enlargement rate P2 in a case where at least one of the ink application amounts of the edge portions Sfl and Sfr exceeds the threshold value Th1 and at least one of the ink application amounts of the edge portions Sbl and Sbr exceeds the threshold value Th1. In other cases, the enlargement rate of the image is determined as the preset enlargement rate P1. That is, in a case where both of the ink application amounts of the edge portions Sfl and Sfr are equal to or less than the threshold value Th1, the enlargement rate of the image is determined as the enlargement rate P1 regardless of the ink application amounts of the edge portions Sbl and Sbr. Further, the enlargement rate of the image is determined as the enlargement rate P1 in a case where at least one of the ink application amounts of the edge portions Sfl and Sfr exceeds the threshold value Th1 and both of the ink application amounts of the edge portions Sbl and Sbr are equal to or less than the threshold value Th1.

Figure 15:
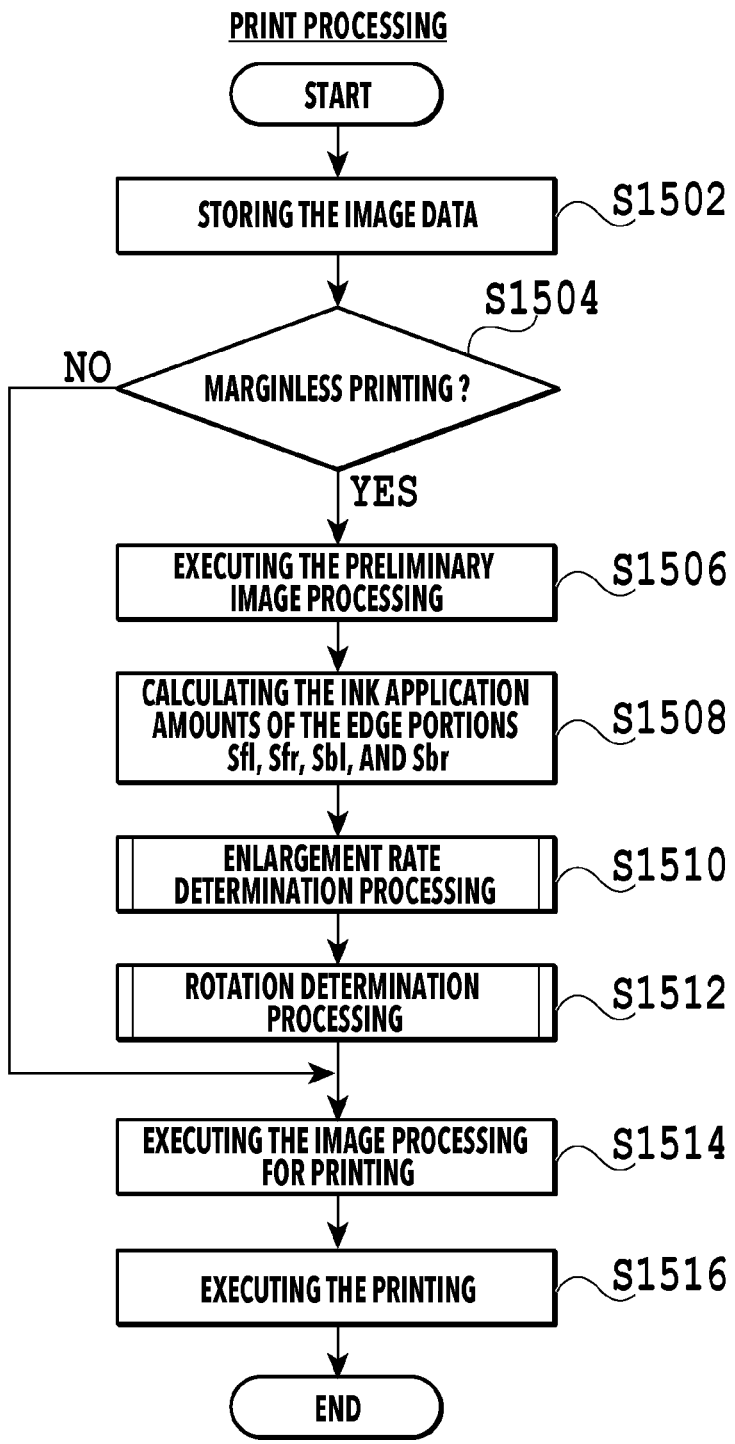
FIG. 15 is a flowchart illustrating a detailed processing routine of print processing according to the different embodiment.

Next, the specific details of the print processing to be executed by the printing apparatus 100 according to the second embodiment will be explained. FIG. 15 is a flowchart illustrating the details of the print processing to be executed by the printing apparatus 100 according to the second embodiment. The series of these processes illustrated in the flowchart of FIG. 15 is performed by the CPU 411 loading a program code recorded in the ROM 412 into the RAM 413 and executing the program code. Alternatively, a part or all of the functions in the steps of FIG. 15 may be executed by hardware such as an ASIC or an electronic circuit. Note that the reference sign "S" in the explanation of each process means that it is a step of the flowchart.

If a job is input from a host apparatus to the printing apparatus 100 together with an instruction to start printing, the CPU 411 holds image data included in the input job data in a storage area such as the RAM 413 (S1502). Next, the CPU 411 determines whether or not the printing instructed to start is marginless printing (S1504). If it is determined in S1504 that the printing is not marginless printing, the processing proceeds to S1514, which will be described later. Further, if it is determined in S1504 that the printing is marginless printing, the CPU 411 executes the preliminary image processing on the low-resolution image data (S1506).

Since the specific details of processing of S1502 to S1506 are the same as those of S1102 to S1106 described above, the detailed explanations thereof will be omitted.

Thereafter, the CPU 411 calculates the average ink application amounts of the four areas, i.e., the edge portions Sfl, Sfr, Sbl, and Sbr (S1508). That is, in S1508, the calculation part 1202 calculates the average ink application amounts of the respective edge portions Sfl, Sfr, Sbl, and Sbr, based on the image data on which the preliminary image processing was performed in S1506. In the present embodiment, the calculation part 1202 functions as a calculation unit that calculates the ink application amounts of the areas provided at the four corners of an image.

Figure 16:
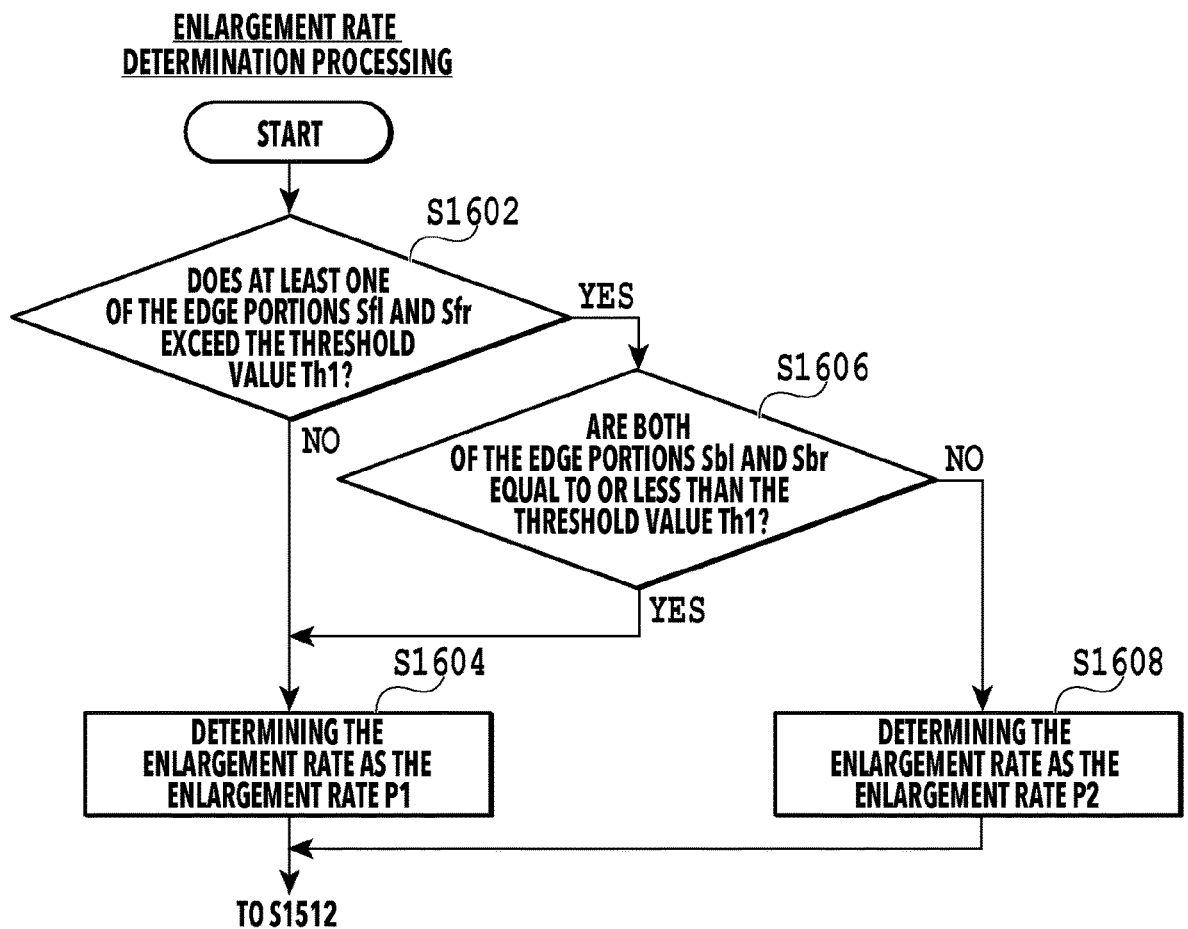
FIG. 16 is a flowchart of enlargement rate determination processing, which is a subroutine of the print processing of FIG. 15.

Next, the CPU 411 performs the enlargement rate determination processing (S1510). Here, FIG. 16 is a flowchart illustrating the details of the enlargement rate determination processing, which is a subroutine of the print processing. This enlargement rate determination processing is executed by the determination part 912, which is a functional configuration of the control part 410 illustrated in FIG. 12, by use of the calculated average ink application amounts of the edge portions.

In the enlargement rate determination processing of S1510, the CPU 411 firstly determines whether or not at least one of the average ink application amounts of the edge portions Sfl and Sfr exceeds the threshold value Th1 (S1602). If it is determined in S1602 that both of the ink application amounts of the edge portions Sfl and Sfr do not exceed the threshold value Th1, the CPU 411 determines the enlargement rate as the enlargement rate P1, with which floating that occurs to the print medium is ignored (S1604), and the processing proceeds to S1512, which will be described later. The specific details of processing of S1604 are the same as those of S1112 described above. On the other hand, if it is determined in S1602 that at least one of the ink application amounts of the edge portions Sfl and Sfr exceeds the threshold value Th1, the CPU 411 determines whether or not both of the average ink application amounts of the edge portions Sbl and Sbr are equal to or less than the threshold value Th1 (S1606).

If it is determined in S1606 that both of the ink application amounts of the edge portions Sbl and Sbr are equal to or less than the threshold value Th1, the processing proceeds to S1604. On the other hand, if it is determined in S1606 that both at least one of the ink application amounts of the edge portions Sbl and Sbr is not equal to or less than the threshold value Th1, the CPU 411 determines the enlargement rate as the enlargement rate P2, with which floating that occurs to the print medium is taken into consideration (S1608), and the processing proceeds to S1512, which will be described later. The specific details of processing of S1608 are the same as those of S1114 described above.

Figure 17:
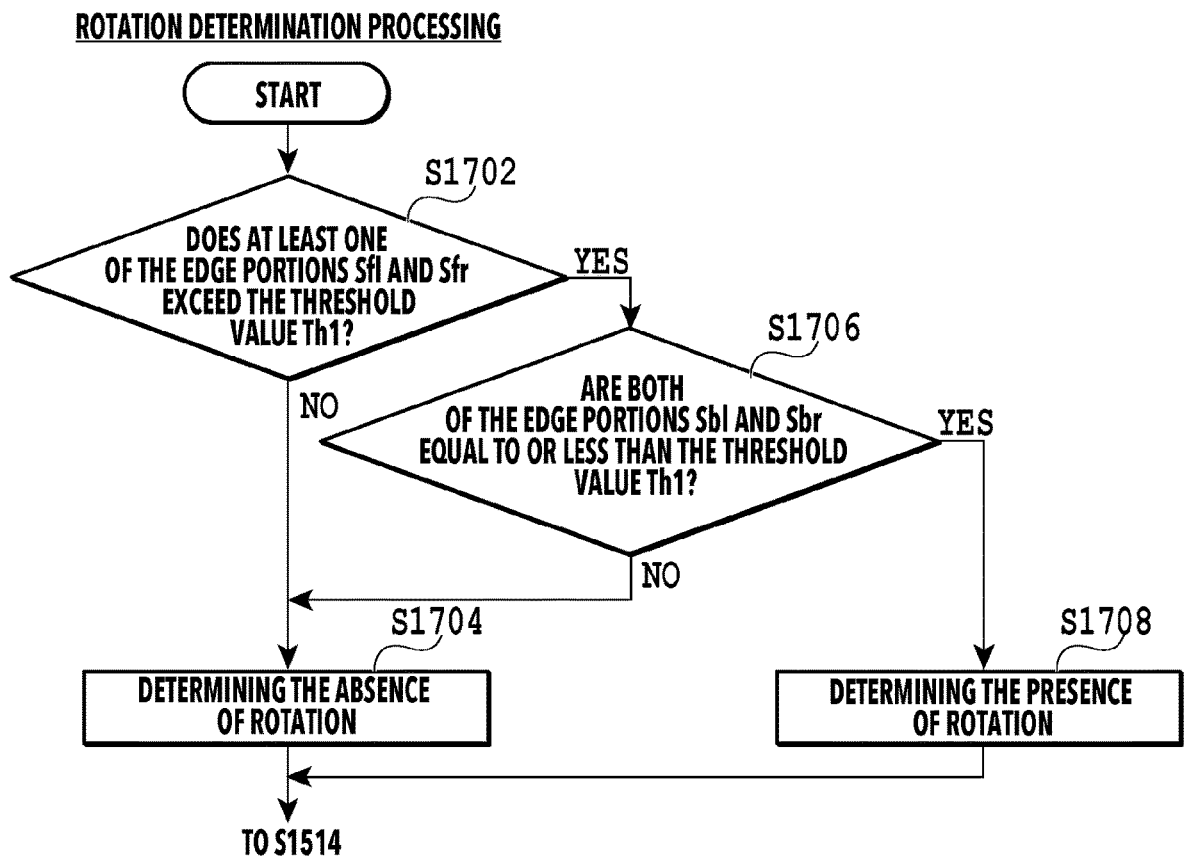
FIG. 17 is a flowchart of rotation determination processing, which is a subroutine of the print processing of FIG. 15.

Returning to FIG. 15, the explanation is continued. If the enlargement rate is determined in this way, the processing proceeds to S1512, so that the CPU 411 performs the rotation determination processing for determining the presence or absence of rotation. Here, FIG. 17 is a flowchart illustrating the details of the rotation determination processing, which is a subroutine of the print processing. This rotation determination processing is executed by the image rotation part 1204, which is a functional configuration of the control part 410 illustrated in FIG. 12, by use of the calculated average ink application amounts of the edge portions.

In the rotation determination processing of S1512, the CPU 411 firstly determines whether or not at least one of the average ink application amounts of the edge portions Sfl and Sfr exceeds the threshold value Th1 (S1702) in a similar manner as in S1602. If it is determined in S1702 that both of the ink application amounts of the edge portions Sfl and Sfr do not exceed the threshold value Th1, the CPU 411 determines that the image data will not be rotated, i.e., "absence of rotation" (S1704), and the processing proceeds to S1514, which will be described later. On the other hand, if it is determined in S1702 that at least one of the ink application amounts of the edge portions Sfl and Sfr exceeds the threshold value Th1, the CPU 411 determines whether or not both of the average ink application amounts of the edge portions Sbl and Sbr are equal to or less than the threshold value Th1 (S1706). Note that the specific details of processing of S1706 are the same as those of S1606 described above.

If it is determined in S1706 that both at least one of the ink application amounts of the edge portions Sbl and Sbr is not equal to or less than the threshold value Th1, the processing proceeds to S1704. On the other hand, if it is determined in S1706 that both of the ink application amounts of the edge portions Sbl and Sbr are equal to or less than the threshold value Th1, the CPU 411 determines the image data will be rotated, i.e., "presence of rotation" (S1708), and the processing proceeds to S1514, which will be described later.

Returning to FIG. 15, the explanation is continued. If the presence or absence of the rotation of the image data is determined, the processing proceeds to S1514, so that the CPU 411 executes the image processing for printing on the high-resolution image data. That is, in S1514, firstly, the image rotation part 1204 rotates the high-resolution image data by 180° according to the determined presence or absence of the rotation. That is, if "absence of rotation" is determined in the rotation determination processing, the image data is not to be rotated, and, if "presence of rotation" is determined, the image data is to be rotated by 180°.

Next, the image size conversion part 904 enlarges the high-resolution image data, which is output from the image rotation part 1204, at the determined enlargement rate. Then, the color conversion part 908 converts the RGB data of the enlarged image data into CMYK data via the color correction part 906. Then, the converted CMYK data is quantized by the quantization part 914, so as to obtain binary data representing ejection or non-ejection of ink from the print head 2. In the present embodiment, the image size conversion part 904 and the image rotation part 1204 function as an enlargement unit that rotates and enlarges image data, based on a calculation result of the calculation part 1202. Further, the color correction part 906, the color conversion part 908, and the quantization part 914 function as a creation unit that creates binary data by performing image processing on image data.

That is, after it is determined in S1504 that the printing is not marginless printing, the binary data is obtained in S1514 without rotating or enlarging the image data. Further, after it is determined in S1504 that the printing is marginless printing, the image data is enlarged at the enlargement rate determined in S1510, and this image data is rotated according to the presence or absence of rotation which is determined in S1512, so as to obtain the binary data.

Thereafter, the CPU 411 performs printing by use of the obtained binary data (S1516) and ends the print processing. Note that, since the specific details of processing of S1516 are the same as those of S1118 described above, the detailed explanations thereof will be omitted.

As explained above, in the printing apparatus 100 according to the second embodiment, the average ink application amounts of the edge portions at the four corners of an image are obtained at the time of marginless printing. Further, if at least one of the ink application amounts of the two edge portions on the leading edge side of an image exceeds a threshold value and both of the ink application amounts of the two edge portions on the rear edge side of the image are equal to or less than the threshold value, the image is rotated by 180° without increasing the enlargement rate of the image. Accordingly, without changing the enlargement rate, floating becomes less likely to occur on the leading edge side of the print medium, where the entering position into the slitter unit 303 is located. Therefore, in the printing apparatus 100 according to the second embodiment, in addition to the functional effects of the first embodiment, the amount of ink used during printing can be suppressed.

Other Embodiments

Note that the above-described embodiments may be modified as shown in the following (1) through (7).

(1) Although not particularly described in the above embodiments, it is also possible that the shape of an edge portion, the area of an edge portion, the threshold value Th1, the enlargement rates of an image, etc., are changed according to various conditions such as the type of print medium to be used, a characteristic of ink, an external environment, etc. For example, the values corresponding to such conditions are experimentally obtained. That is, the occurrence and the degree of floating of the print medium differ depending on the conditions such as the type of print medium, a characteristic of ink, and an external environment. Therefore, the shape of an edge portion, the area of an edge portion, the threshold value Th1, the enlargement rates of an image, etc., are experimentally obtained according to such conditions that affect the occurrence of floating of the print medium. Here, the experimentally obtained values may be directly used, or it is also possible that the threshold value is reduced by a predetermined amount and the area and enlargement rates are increased by a predetermined amount. Accordingly, it becomes possible to more reliably suppress the generation of a margin during marginless printing.

(2) Although not particularly described in the above embodiments, such a configuration in which the user can select whether or not to execute the print processing explained in the above-described embodiments for suppressing the occurrence of a margin at the time of marginless printing is also possible. In this case, in a case where the print processing for suppressing the occurrence of a margin at the time of marginless printing is not selected, if the start of printing is instructed, the printing is performed with execution of the image processing for printing after the high-resolution image data is held. Further, in the above-described embodiments, although the low-resolution image data is used for the preliminary image processing and the high-resolution image data is used for the image processing for printing, there is not a limitation as such. That is, it is also possible that the high-resolution image data is used for the preliminary image processing, so that the ink application amounts are simply calculated from the image data.

(3) In the above-described embodiments, although the enlargement rate P1 for ignoring the floating occurring to the print medium and the enlargement rate P2 for taking the floating into consideration are selectively applied, there is not a limitation as such. That is, regarding the enlargement rate for taking the floating into consideration, such a configuration in which multiple enlargement rates are used according to the degree of the floating so that an enlargement rate in accordance with an ink application amount can be selected is also possible. Further, in the above-described embodiments, although a printing duty is used as an ink application amount, there is not a limitation as such. That is, it is also possible to use a total dot number in an edge portion or an average value of the dot numbers respectively applied to predetermined areas in an edge portion, so it is possible to use any value as long as the value indicates an application amount of ink to an edge portion.

(4) In the above-described embodiments, although the printing apparatus 100 is what is termed as a serial scan type in which printing is performed while performing scanning of the print head 2 via the carriage 3, there is not a limitation as such. That is, it is also possible to use a full-line type printing apparatus in which a print head equipped with a nozzle row having a length corresponding to the size of a print medium in the width direction is fixedly arranged. Further, in the above-described embodiments, although the slitter 13 includes the two slitter units 303L and 303R, there is not a limitation as such. That is, there may be such a form in which the slitter 13 is equipped with one slitter unit 303. In this case, with respect to the X direction, a slitter conveyance roller is disposed on the other side, where the slitter unit 303 is not located.

(5) In the above-described embodiments, although the control part 410 of the printing apparatus 100 determines the enlargement rate (and the presence or absence of rotation) of the image and obtains the binary data representing ejection or non-ejection of ink from the print head 2 by use of the enlargement rate (and the presence or absence of rotation), there is not a limitation as such. That is, it is also possible that such processing, specifically, the processing up to the image processing for printing of the entire print processing explained in the above-described embodiments, is executed by such an image processing apparatus connected to the printing apparatus 100 as a host apparatus or the like, for example. Further, in the above-described embodiments, although the image data is enlarged at the enlargement rate P1 at the time of marginless printing in a case where an ink application amount of an edge portion is equal to or less than the threshold value, etc., there is not a limitation as such. That is, it is also possible that image data enlarged at the enlargement rate P1 is input from the application 902 as the image data for marginless printing. Further, in the above-described embodiments, although the binary data is obtained as the data to be printed by the print head 2, there is not a limitation as such. That is, it is also possible that the data for printing is multi-valued data of quaternary values, for example.

(6) In the above-described second embodiment, although the determination part 912 determines the enlargement rate and the image rotation part 1204 determines the presence or absence of rotation, there is not a limitation as such. That is, it is also possible that the functions of the determination part 912 include a function of determining the presence or absence of rotation of the image. Accordingly, in the print processing, for example, it is not necessary to repeatedly execute the same processes such as S1602 of the enlargement rate determination processing and S1702 of the rotation determination processing, so that it is possible to efficiently determine the enlargement rate and the presence or absence of rotation.

Specifically, if it is determined that both of the ink application amounts of the edge portions Sfl and Sfr do not exceed the threshold value Th1, the enlargement rate P1 and the absence of rotation are determined by the determination part 912. Further, if it is determined that at least one of the ink application amounts of the edge portions Sfl and Sfr exceeds the threshold value Th1 and then both at least one of the ink application amounts of the edge portions Sbl and Sbr is not equal to or less than the threshold value Th1, the enlargement rate P2 and the absence of rotation are determined by the determination part 912. Further, if it is determined that at least one of the ink application amounts of the edge portions Sfl and Sfr exceeds the threshold value Th1 and then both of the ink application amounts of the edge portions Sbl and Sbr are equal to or less than the threshold value Th1, the enlargement rate P1 and the presence of rotation is determined by the determination part 912.

(7) The above-described embodiments and various forms shown in (1) through (6) may be combined as appropriate.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-159661, filed Sep. 24, 2020, which is hereby incorporated by reference wherein in its entirety.

What is claimed is:

1. A printing apparatus comprising:
a conveyance unit configured to convey a print medium in a conveyance direction;
a printing unit configured to print an image by applying ink to the print medium which is conveyed by the conveyance unit;
a slitter unit disposed on a downstream side in the conveyance direction relative to the printing unit and configured to cut the print medium along the conveyance direction at a position according to a size of a product in a width direction of the print medium, the width direction intersecting the conveyance direction;
an image processing unit configured to perform image processing on image data to obtain data for printing; and
a control unit configured to control the slitter unit to cut a width-direction end portion of the printed image after the image is printed based on the data for printing, so as to thereby generate the product,
wherein the image processing unit
calculates a first ink application amount of a first area and a second ink application amount of a second area, based on the image data, the first area being formed at one end portion in the width direction on a leading edge side of the image which is located on the downstream side in the conveyance direction during printing, the second area being formed at the other end in the width direction on the leading edge, and
enlarges the image data at a predetermined ratio to obtain the data for printing in a case where at least one of the first ink application amount and the second ink application amount exceeds a threshold value.

2. The printing apparatus according to claim 1, wherein, for obtaining the data for printing, the image processing unit enlarges the image data at a second enlargement rate that is smaller than a first enlargement rate, which is the predetermined ratio, in a case where both of the first ink application amount and the second ink application amount are equal to or less than the threshold value.

3. The printing apparatus according to claim 1, wherein a resolution of the image data used by the image processing unit to calculate the ink application amounts is lower than a resolution of the image data used to obtain the data for printing.

4. The printing apparatus according to claim 1, wherein the threshold value is a lower limit value of ink application amount with which floating occurs to the print medium or a value that is less than the lower limit value by a predetermined amount.

5. The printing apparatus according to claim 1, wherein the first area is a rectangular area having a predetermined length in the conveyance direction and a predetermined length in the width direction from a first corner on one side of the width direction on the leading edge side of the image which is located on the downstream side in the conveyance direction during printing, and
wherein the second area is a rectangular area having the predetermined length in the conveyance direction and the predetermined length in the width direction from a second corner on the other side of the width direction on the leading edge side.

6. The printing apparatus according to claim 1, wherein an ink application amount calculated by the image processing unit is a printing duty which indicates an ink application amount for a unit area.

7. The printing apparatus according to claim 1, wherein the generated product is a product in which a margin adjacent to the width-direction end portion of the printed image is not formed.

8. The printing apparatus according to claim 7, wherein the threshold value is a lower limit value of ink application amount which causes the print medium to float, which forms a margin adjacent to the width-direction end portion of the image that is cut by the slitter unit, or a value that is less than the lower limit value by a predetermined amount.

9. The printing apparatus according to claim 1, wherein the image processing unit performs image processing on not-enlarged image data to obtain the data for printing, and wherein, after printing is performed based on the obtained data for printing, the slitter unit cuts a position which is separated from the width-direction end portion of the printed image, so that a product in which a margin adjacent to the width-direction end portion of the image is formed can be further obtained.

10. A printing apparatus comprising:

a conveyance unit configured to convey a print medium in a conveyance direction;

a printing unit configured to print an image by applying ink to the print medium which is conveyed by the conveyance unit;

a slitter unit disposed on a downstream side in the conveyance direction relative to the printing unit and configured to cut the print medium along the conveyance direction at a position according to a size of a product in a width direction of the print medium, the width direction intersecting the conveyance direction;

an image processing unit configured to perform image processing on image data to obtain data for printing; and a control unit configured to control the slitter unit to cut a width-direction end portion of the printed image after the image is printed based on the data for printing, so as to thereby generate the product, wherein the image processing unit calculates a first ink application amount of a first area, a second ink application amount of a second area, a third ink application amount of a third area, and a fourth ink application amount of a fourth area, based on the image data, the first area being formed at one end portion in the width direction on a leading edge side of the image which is located on the downstream side in the conveyance direction during printing, the second area being formed at the other end portion in the width direction on the leading edge side, the third area being formed at one end portion in the width direction on a rear edge side of the image which is located on an upstream side in the conveyance direction during printing, the fourth area being formed at the other end portion in the width direction on the rear edge side, rotates the image data by 180° to obtain the data for printing in a case where at least one of the first ink application amount and the second ink application amount exceeds a threshold value and both of the third ink application amount and the fourth ink application amount are equal to or less than the threshold value, and enlarges the image data at a predetermined ratio without rotating the image data to obtain the data for printing in a case where at least one of the first ink application amount and the second ink application amount exceeds the threshold value and at least one of the third ink application amount and the fourth ink application amount exceeds the threshold value.

11. The printing apparatus according to claim 10, wherein, for obtaining the data for printing, the image processing unit enlarges the image data at a second enlargement rate that is smaller than a first enlargement rate, which is the predetermined ratio, in a case where both of the first ink application amount and the second ink application amount are equal to or less than the threshold value and in a case where at least one of the first ink application amount and the second ink application amount exceeds the threshold value and both of the third ink application amount and the fourth ink application amount are equal to or less than the threshold value.

12. The printing apparatus according to claim 10, wherein the first area is a rectangular area having a predetermined length in the conveyance direction and a predetermined length in the width direction from a first corner on one side of the width direction on the leading edge side of the image which is located on the downstream side in the conveyance direction during printing, wherein the second area is a rectangular area having the predetermined length in the conveyance direction and the predetermined length in the width direction from a second corner on the other side of the width direction on the leading edge side, wherein the third area is a rectangular area having the predetermined length in the conveyance direction and the predetermined length in the width direction from a third corner on one side of the width direction on a rear edge side of the image which is located on an upstream side in the conveyance direction during printing, and wherein the fourth area is a rectangular area having the predetermined length in the conveyance direction and the predetermined length in the width direction from a fourth corner on the other side of the width direction on the rear edge side.

13. An image processing apparatus that generates data for printing to be used by a printing apparatus for printing of an image, the printing apparatus being configured to generate a product by printing the image by applying ink to a print medium which is conveyed in a conveyance direction and cutting a width-direction end portion of the print medium along the conveyance direction, the width direction intersecting the conveyance direction, the image processing apparatus comprising:

a calculation unit configured to calculate a first ink application amount of a first area and a second ink application amount of a second area, based on image data, the first area being formed at one end portion in the width direction on a leading edge side of the image which is located on a downstream side in the conveyance direction during printing, the second area being formed at the other end in the width direction on the leading edge side;

an enlargement unit configured to enlarge the image data at a predetermined ratio in a case where at least one of the first ink application amount and the second ink application amount exceeds a threshold value; and a creation unit configured to create the data for printing by performing image processing on the image data enlarged by the enlargement unit.

14. An image processing apparatus that generates data for printing to be used by a printing apparatus for printing of an image, the printing apparatus being configured to generate a product by printing the image by applying ink to a print medium which is conveyed in a conveyance direction and cutting a width-direction end portion of the print medium along the conveyance direction, the width direction intersecting the conveyance direction, the image processing apparatus comprising:

a calculation unit configured to calculate a first ink application amount of a first area, a second ink application amount of a second area, a third ink application amount of a third area, and a fourth ink application amount of a fourth area, based on image data, the first area being formed at one end portion in the width direction on a leading edge side of the image which is located on a downstream side in the conveyance direction during printing, the second area being formed at the other end in the width direction on the leading edge side, the third area being formed at one end portion in the width direction on a rear edge side of the image which is located on an upstream side in the conveyance direction during printing, the fourth area being formed at the other end in the width direction on the rear edge side;

an enlargement unit configured to rotate the image data by 180° in a case where at least one of the first ink application amount and the second ink application amount exceeds a threshold value and both of the third ink application amount and the fourth ink application amount are equal to or less than the threshold value and configured to enlarge the image data at a predetermined ratio without rotating the image data in a case where at least one of the first ink application amount and the second ink application amount exceeds the threshold value and at least one of the third ink application amount and the fourth ink application amount exceeds the threshold value; and a creation unit configured to create the data for printing by performing image processing on the image data processed by the enlargement unit.

* * * * *